(12) United States Patent
Kwon et al.

(10) Patent No.: US 12,506,367 B2
(45) Date of Patent: Dec. 23, 2025

(54) METHOD AND DEVICE FOR UTILIZING COUPLING FACTOR IN WIRELESS POWER TRANSMISSION SYSTEM

(71) Applicant: LG Electronics Inc., Seoul (KR)

(72) Inventors: Taewook Kwon, Seoul (KR); Gyunghwan Yook, Seoul (KR); Jinho Youn, Seoul (KR); Hongkwon Kim, Seoul (KR); Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/284,201

(22) PCT Filed: Mar. 28, 2022

(86) PCT No.: PCT/KR2022/004315
§ 371 (c)(1),
(2) Date: Sep. 26, 2023

(87) PCT Pub. No.: WO2022/203481
PCT Pub. Date: Sep. 29, 2022

(65) Prior Publication Data
US 2024/0154466 A1 May 9, 2024

(30) Foreign Application Priority Data
Mar. 26, 2021 (KR) .................... 10-2021-0039875

(51) Int. Cl.
*H02J 50/60* (2016.01)
*H02J 50/10* (2016.01)
*H02J 50/80* (2016.01)

(52) U.S. Cl.
CPC .............. *H02J 50/60* (2016.02); *H02J 50/10* (2016.02); *H02J 50/80* (2016.02)

(58) Field of Classification Search
CPC .. H02J 50/60; H02J 50/10; H02J 50/80; H02J 50/12; H02J 50/20; H02J 50/90; H04L 69/22; H04L 69/24
See application file for complete search history.

(56) References Cited

U.S. PATENT DOCUMENTS

2019/0081516 A1* 3/2019 Shahsavari ............. H02J 50/60
* cited by examiner

*Primary Examiner* — Daniel Cavallari
(74) *Attorney, Agent, or Firm* — Fish & Richardson P.C.

(57) ABSTRACT

The present disclosure provides a method by which a wireless power transmitter transmits wireless power in a wireless power transmission system, and a device using same, the method comprising: receiving, from a wireless power receiver, information for sensing whether a foreign object (FO) is present; sensing, on the basis of the information, whether the FO is present before the transmission of wireless power; transmitting, on the basis of sensing that the FO is not present, the wireless power to the wireless power receiver; and measuring a slot quality factor and a coupling factor on a slot while the wireless power is transmitted, wherein the slot quality factor is a quality factor used to determine whether the FO is inserted while the wireless power is transmitted, and the coupling factor is a factor related to the alignment between the wireless power transmitter and the wireless power receiver.

11 Claims, 27 Drawing Sheets

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

| | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

$$Q = 2\pi f_0 \frac{E_{stored}}{P_{loss}}$$

$$Q = \frac{1}{R}\sqrt{\frac{L}{C}} = \frac{2\pi f_o L}{C} = \frac{1}{2\pi f_o RC}$$

FIG. 25

|  | Pre-power Q | Slot Q | K |
|---|---|---|---|
| Exact center alignment | 50 | 49 | 0.48 |
| move 1cm | 50 | 50 | 0.42 |
| move 2cm | 51 | 48 | 0.26 |
| FO insertion | 30 | 30 | 0.29 |

FIG. 27

- CE -- CE -- RP/0 -- ATN -- CE -- DSR/poll -- FOD Status Data Packet -- CE -- RP/1 -- ACK -- CE -- CE -- RP/2 -- ACK -- CE -- CE -- RP/0 -- ACK -- CE -

\* Power transfer phase

\* Recalibration phase

FIG. 28

* FOD Status Data Packet (Header Code 0x01)

| | b7 | b6 | b5 | b4 | b3 | b2 | b1 | b0 |
|---|---|---|---|---|---|---|---|---|
| B0 | Reserved | | | FO Presence Probability | | | Request | |

* Request
  0: Report only
  1: Request extended calibration (RP/2)
  2: Request recalibration (RP/1 ... RP/2)
  3: Reserved

FIG. 30

(a) -- CE -- CE -- RP/0 -- ACK -- CE -- NEGO -- ACK -- GRQ/k -- k Packet -- SRQ/en -- ACK -- CE -- CE -- RP/0 -- ACK
-- CE -- CE \* Power transfer phase    \* Renegotiation phase (b) -- CE -- CE -- RP/0 -- ACK -- CE -- GRQ/k -- k Packet -- CE -- CE -- RP/0 -- ACK -- CE --
CE (c) -- CE -- CE -- RP/0 -- ATN -- CE -- DSR/poll -- k Packet -- CE -- CE -- RP/0 -- ACK -- CE --
CE

FIG. 31

- CE - CE - RP/0 - ATN - CE - DSR/poll - V1 Packet - CE - RP/1 - <u>ACK</u> - CE - CE - RP/2 - <u>ACK</u> - CE - CE - RP/0 - <u>ACK</u> - CE - RP/0 - <u>ACK</u> - CE -

\* Recalibration phase

METHOD AND DEVICE FOR UTILIZING COUPLING FACTOR IN WIRELESS POWER TRANSMISSION SYSTEM

CROSS-REFERENCE TO RELATED APPLICATIONS

This application is the National Stage filing under 35 U.S.C. 371 of International Application No. PCT/KR2022/004315, filed on Mar. 28, 2022, which claims the benefit of Korean Patent Application No. 10-2021-0039875 filed on Mar. 26, 2021, which is hereby incorporated by reference herein in its entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, the aim is to provide a method for measuring quality factors and coupling factors during wireless power transfer and a device using the same.

SUMMARY

According to an embodiment of the present specification, a method and apparatus characterized by performing measurement of slot quality factor and coupling factor on the slot while transmitting the wireless power, where the slot quality factor is a quality factor used to determine whether an FO is inserted while transmitting the wireless power and the coupling factor is a factor related to alignment between the wireless power transmitter and the wireless power receiver, are provided.

According to the present specification, the effect of maintaining the effectiveness of the FOD function can be achieved by performing re-compensation according to alignment changes.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 25 shows a specific example of detecting a change in detection and alignment of the FO based on the quality factor (Q before power transfer and slot Q during power transfer) and the coupling factor (K).

FIG. 27 schematically shows an example of detecting an alignment change and performing recalibration after measuring the K value of the TX when re-calibration is initiated by the wireless power transmitter.

FIG. 28 schematically shows an example of an FOD status data packet.

FIG. 30 schematically shows how a wireless power receiver receives information about K from a wireless power transmitter.

FIG. 31 schematically shows an example of re-calibration initiated by RX.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
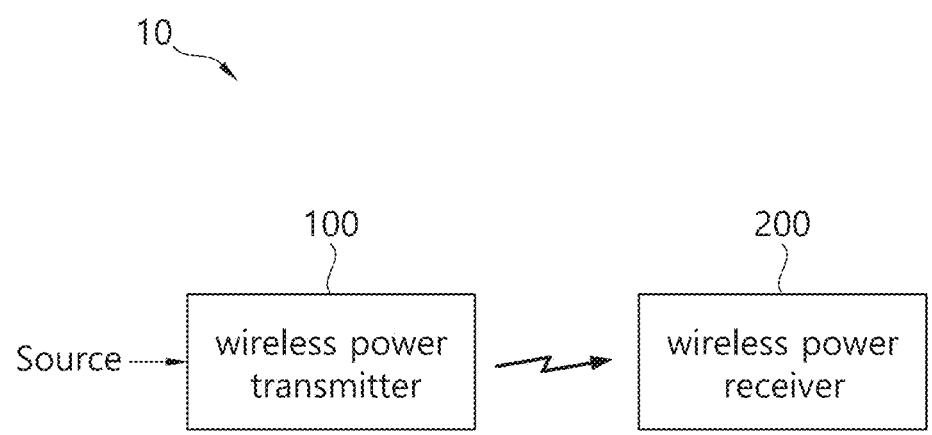
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
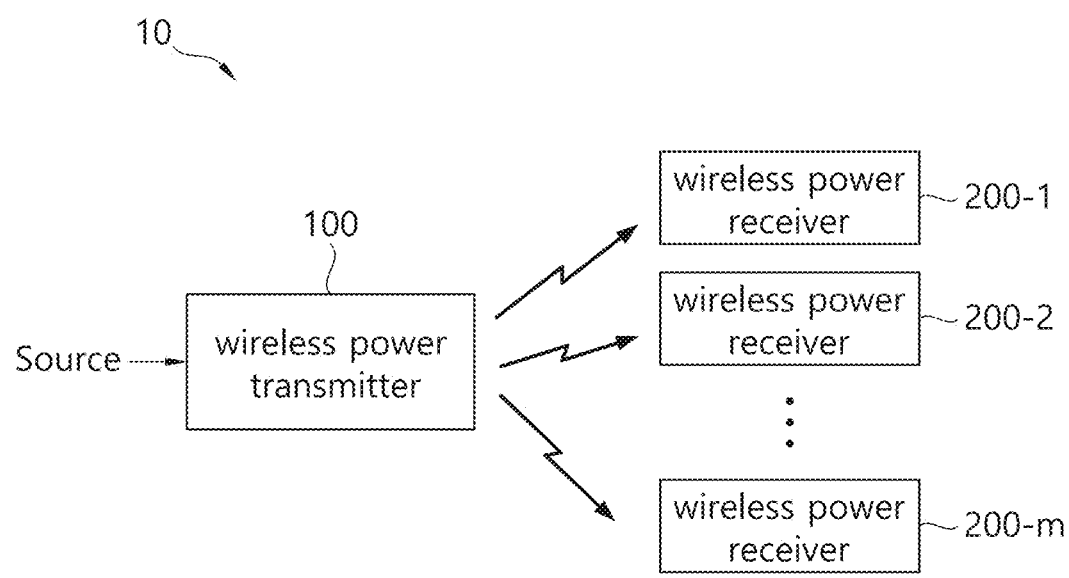
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
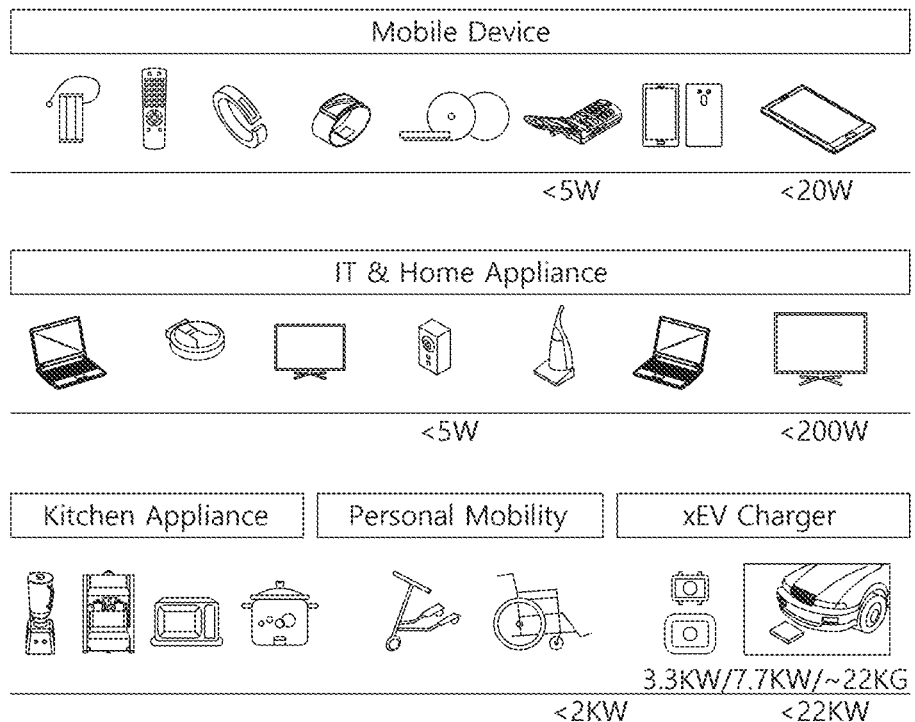
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 5:
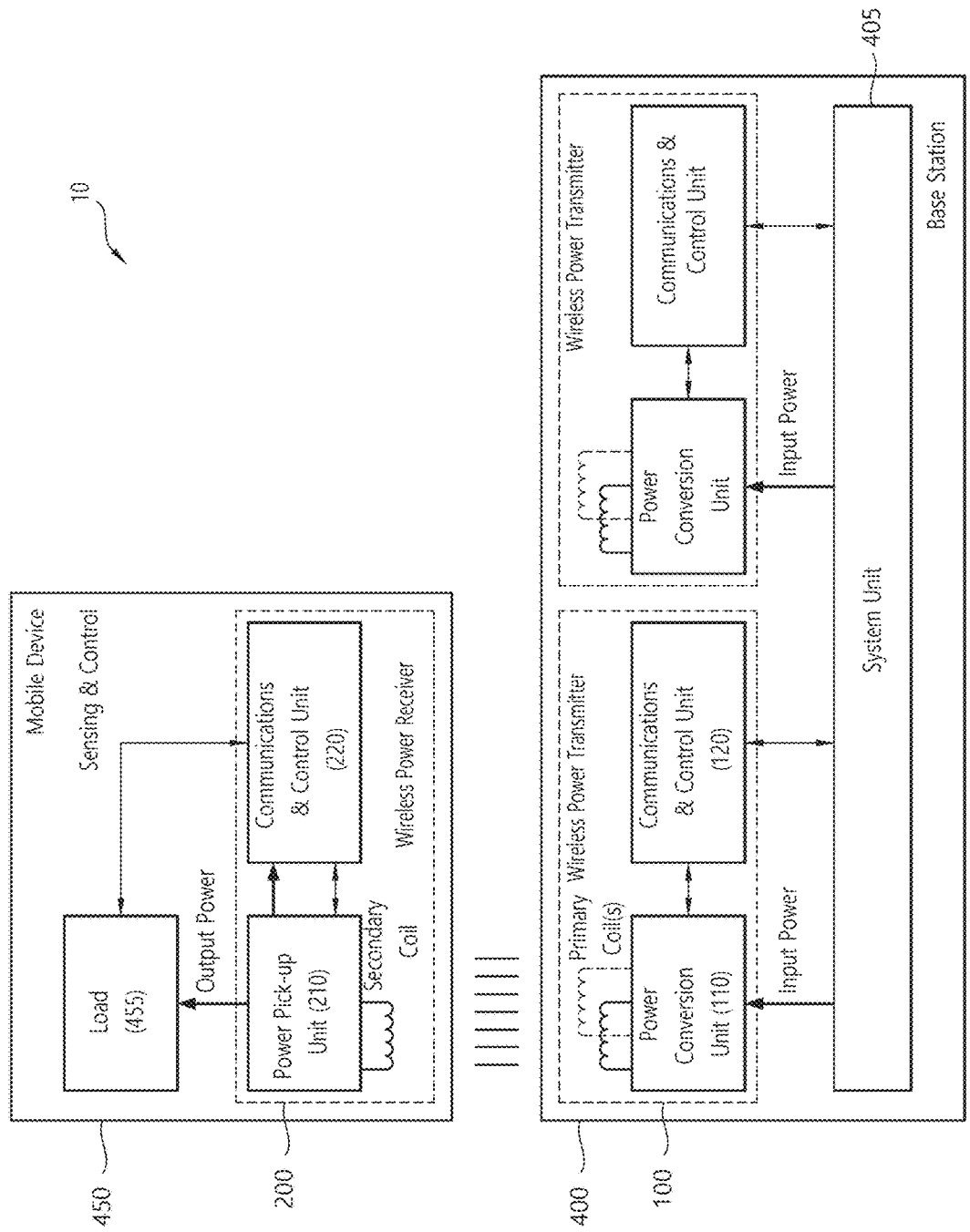
FIG. 5 is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure. Referring to FIG. 5, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
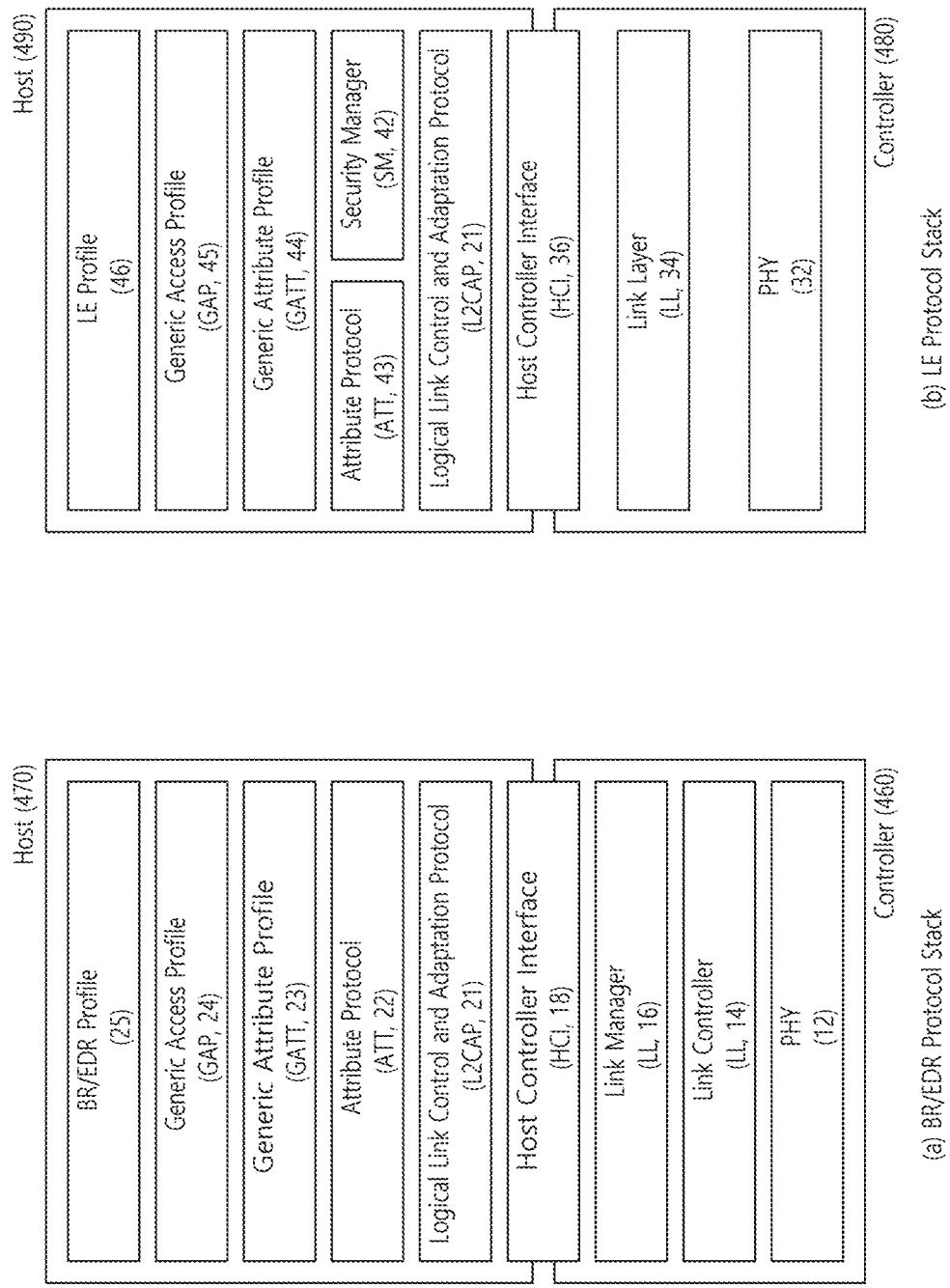
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18:

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.
  Performs ACL/SCO logical transport, logical link setup, and control.
  Detach: It interrupts connection and informs a counterpart device about a reason for the interruption.
  Performs power control and role switch.
  Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event. ADV_IND: Connectable undirected advertising event ADV_DIRECT_IND: Connectable directed advertising event ADV_NONCONN_IND: Unconnectable undirected advertising event ADV_SCAN_IND: Scannable undirected advertising event The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
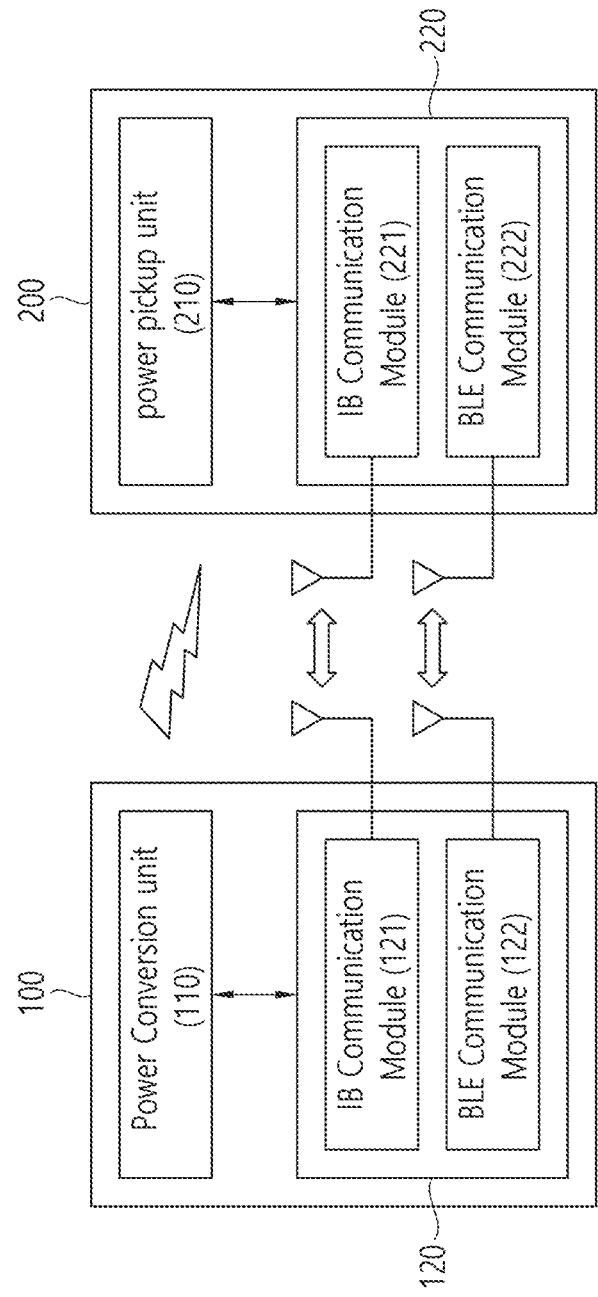
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
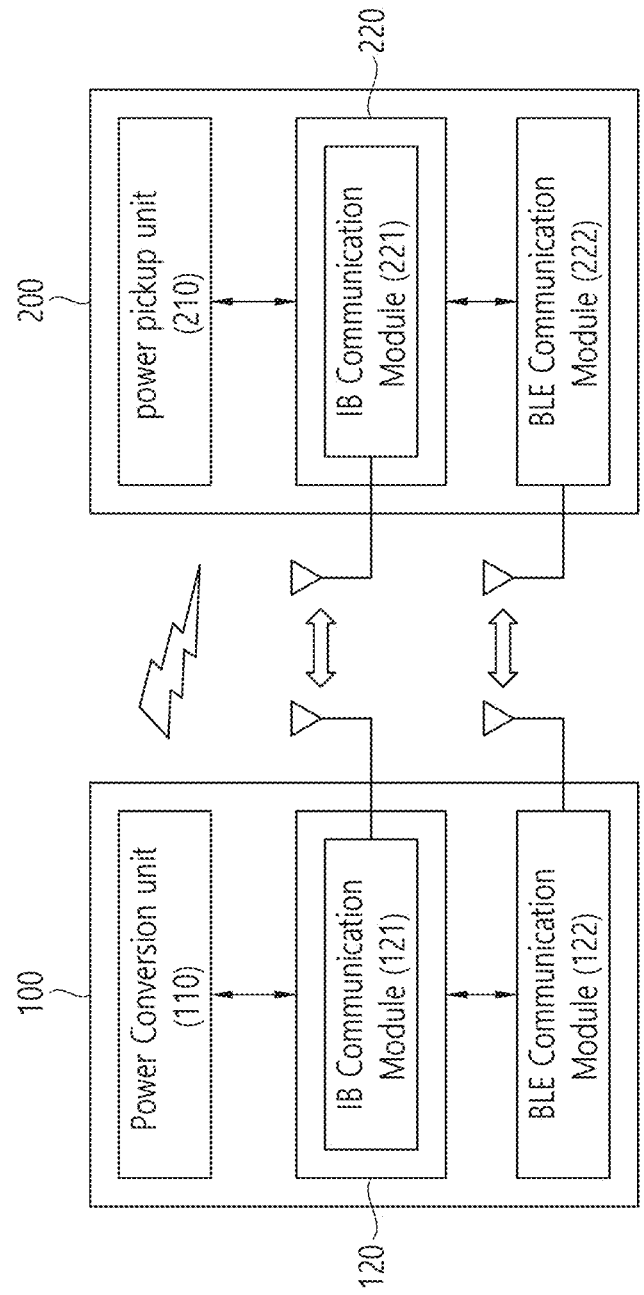
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
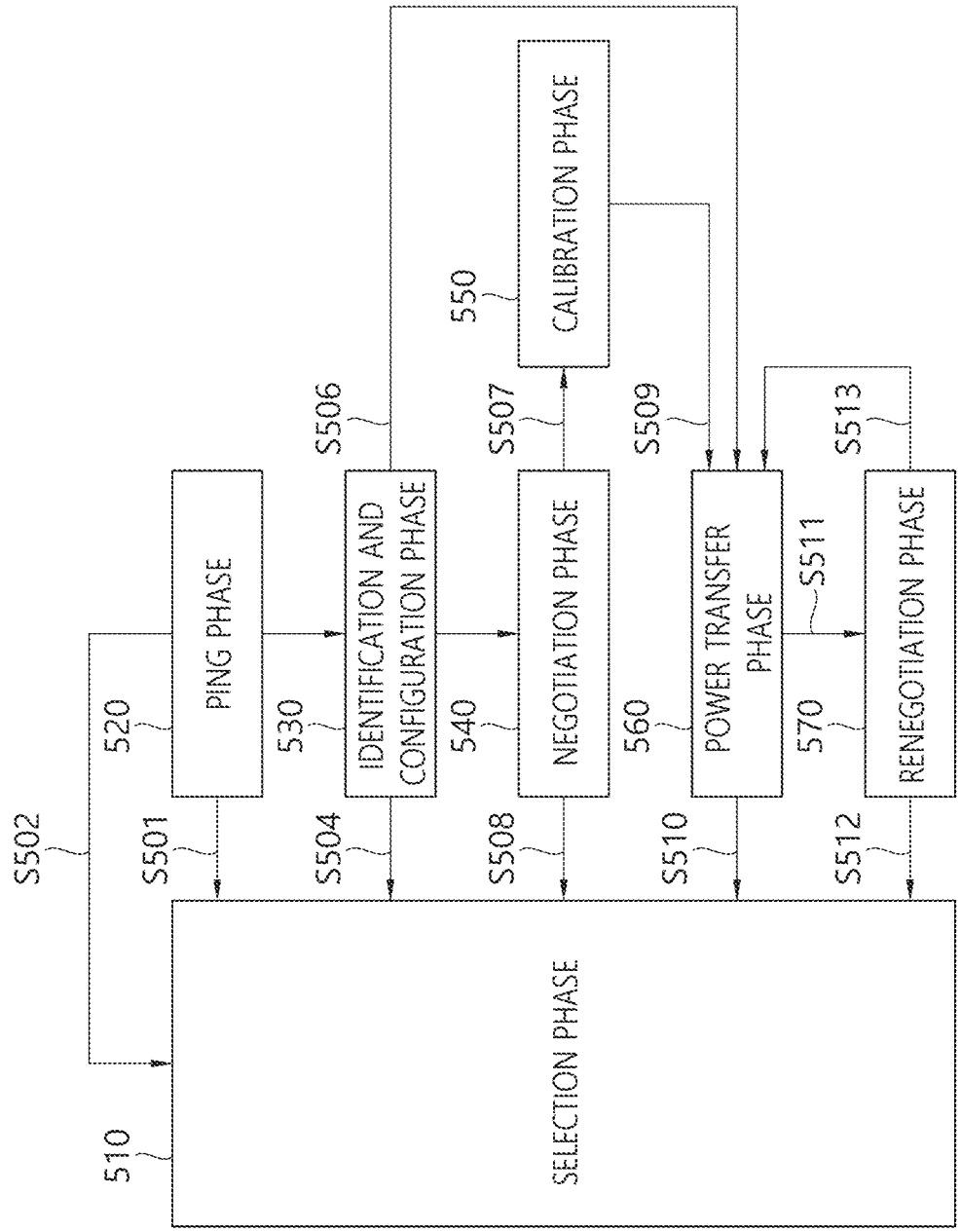
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value-in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet-from the receiver, the process may be shifted back to the selection phase (510). Additionally, in the ping phase (520), if the wireless power transmitter receives a signal indicating the completion of the power transfer—e.g., charging complete packet-from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570) . . . . At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
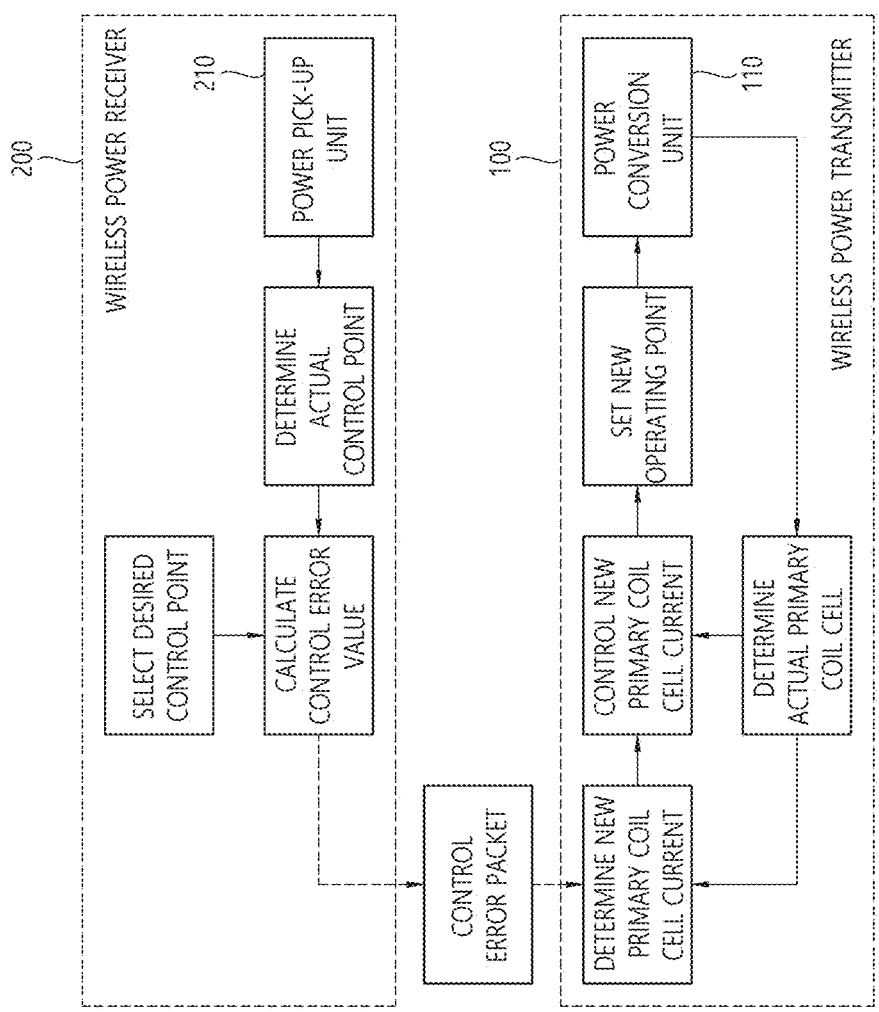
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
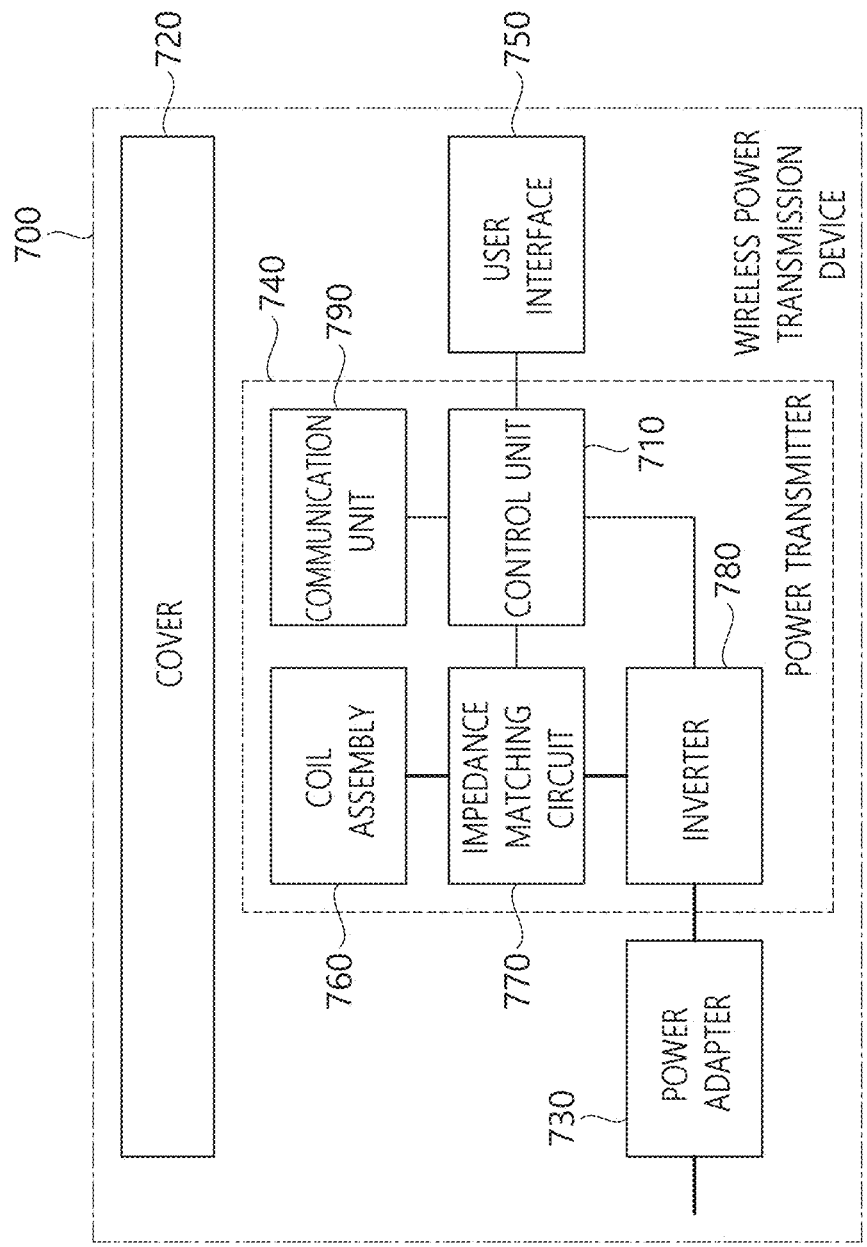
FIG. 11 is a block diagram of a wireless power transmitter according to another exemplary embodiment of the present disclosure.

FIG. 11 is a block diagram of a wireless power transmitter according to another exemplary embodiment of the present disclosure.

This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
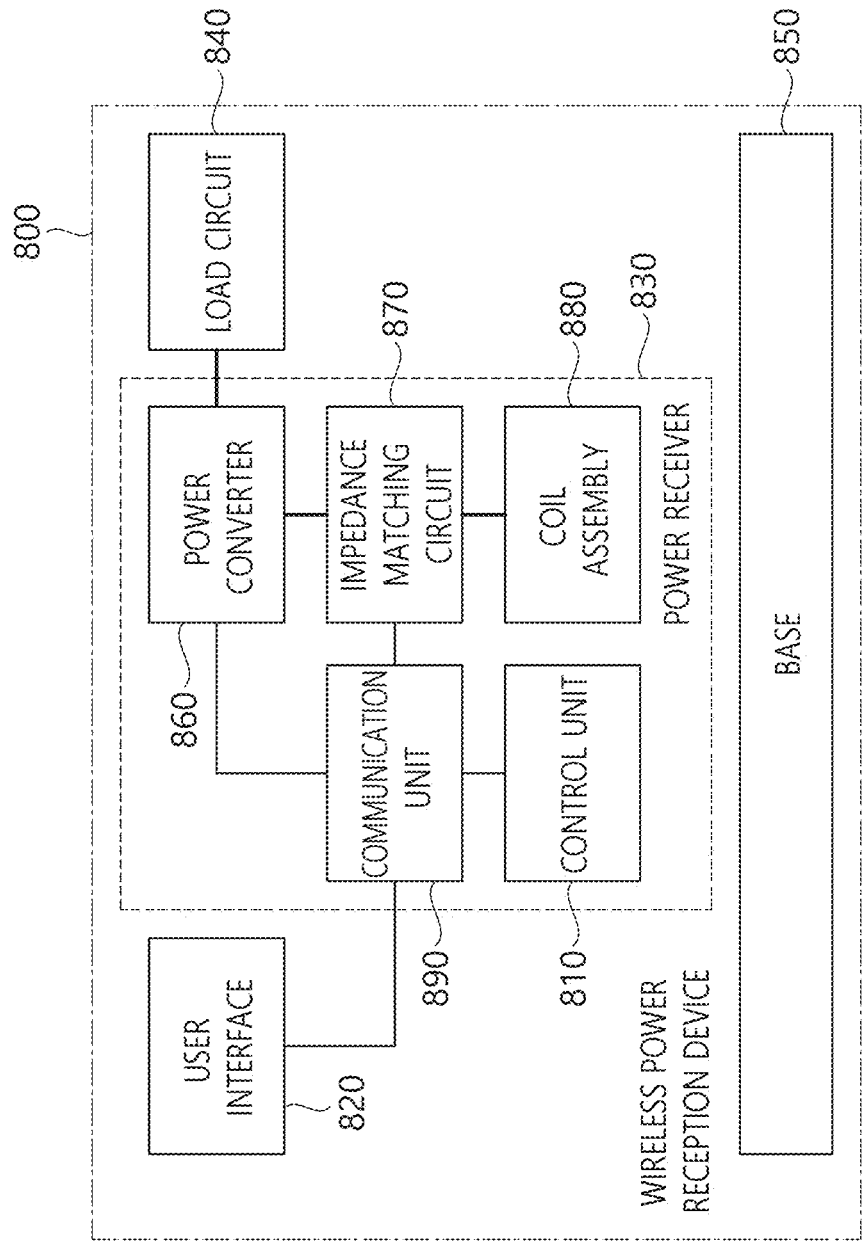
FIG. 12 shows a wireless power receiver according to another exemplary embodiment of the present disclosure.

FIG. 12 shows a wireless power receiver according to another exemplary embodiment of the present disclosure.

This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
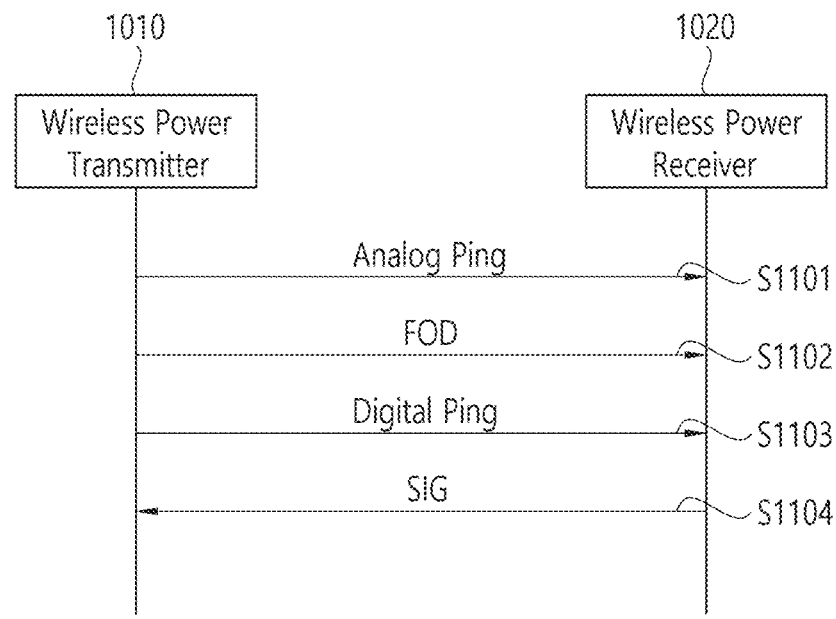
FIG. 13 is a flowchart schematically showing a ping phase protocol according to an embodiment.

FIG. 13 is a flowchart schematically showing a ping phase protocol according to an embodiment.

Referring to FIG. 13, in the ping phase, the wireless power transmitter 1010 transmits an analog ping to determine whether an object exists in the operating volume (S1101). The wireless power transmitter 1010 can detect whether an object exists in the operating space based on a change in current in the transmission coil or primary coil.

If an object is determined to exist within the operating space by an analog ping, the wireless power transmitter 1010 may perform foreign object detection (FOD) before power transmission to check whether foreign materials exist in the operating volume (S1102). The wireless power transmitter 1010 may perform operations to protect NFC cards and/or RFID tags.

Afterwards, the wireless power transmitter 1010 identifies the wireless power receiver 1020 by transmitting a digital ping (S1103). The wireless power receiving device 1020 receives a digital ping and recognizes the wireless power transmitting device 1010.

The wireless power receiver 1020 that receives the digital ping transmits a signal strength packet (SIG) to the wireless power transmitter 1010 (S1104).

The wireless power transmitter 1010 that receives the SIG from the wireless power receiver 1020 can identify that the wireless power receiver 1020 is located within an operating volume.

Figure 14:
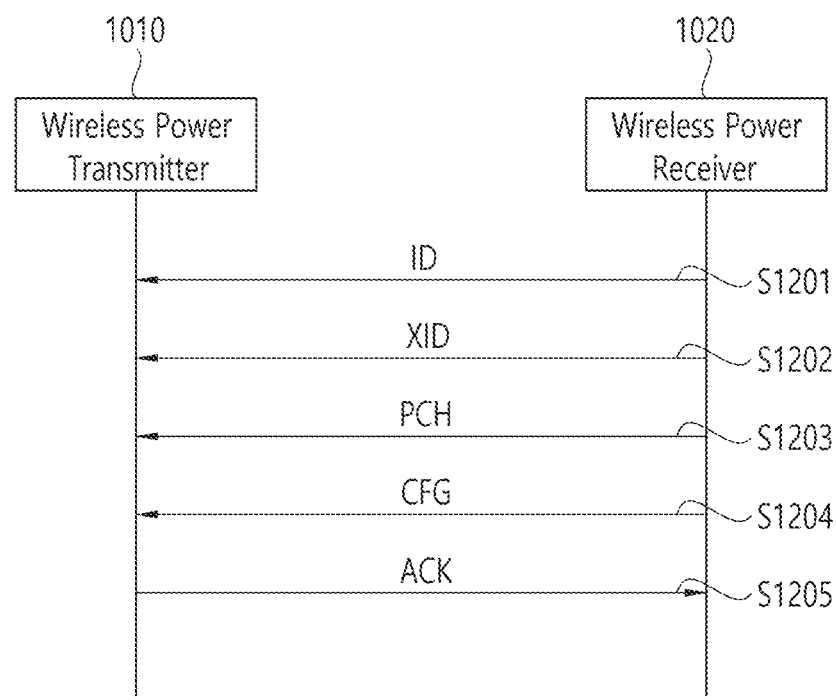
FIG. 14 is a flowchart schematically showing a configuration phase protocol according to an embodiment.

FIG. 14 is a flowchart schematically showing a configuration phase protocol according to an embodiment.

In the configuration phase (or identification and configuration phase), the wireless power receiving device 1020 transmits its identification information to the wireless power transmitting device 1010, the wireless power receiver 1020 and the wireless power transmitter 1010 can establish a baseline power transfer contract.

Referring to FIG. 14, in the configuration phase, the wireless power receiving device 1020 may transmit an ID (identification data packet) to the wireless power transmitting device 1010 to identify itself (S1201). Additionally, the wireless power receiving device 1020 may transmit an Extended Identification data packet (XID) to the wireless power transmitting device 1010 (S1202). Additionally, the wireless power receiving device 1020 may transmit a Power Control Hold-off data packet (PCH) to the wireless power transmitting device 1010 for a power transmission contract, etc. (S1203). Additionally, the wireless power receiving device 1020 can transmit a configuration packet (CFG, Configuration data packet) to the wireless power transmitting device (S1204).

When following the Extended Protocol for EPP, the wireless power transmitter 1010 may transmit ACK in response to CFG (S1205).

Figures 15, 16:
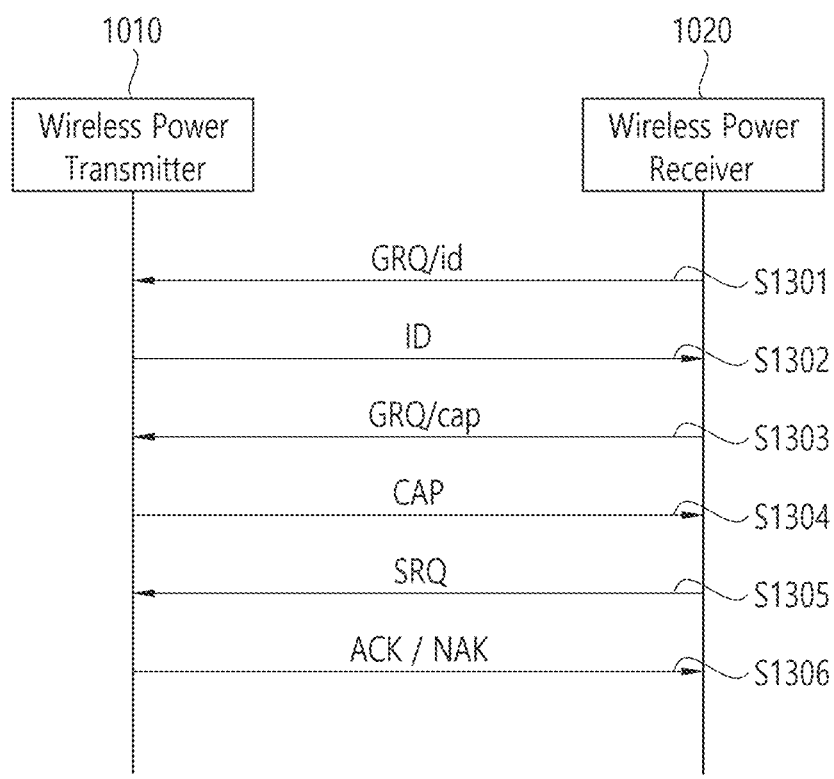
FIG. 15 is a diagram illustrating a message field of a configuration packet (CFG) of a wireless power reception device according to an embodiment.
FIG. 16 is a flowchart schematically showing a protocol of a negotiation phase or re-negotiation phase according to an embodiment.

FIG. 15 is a diagram illustrating a message field of a configuration packet (CFG) of a wireless power reception device according to an embodiment.

Figures 17, 18:
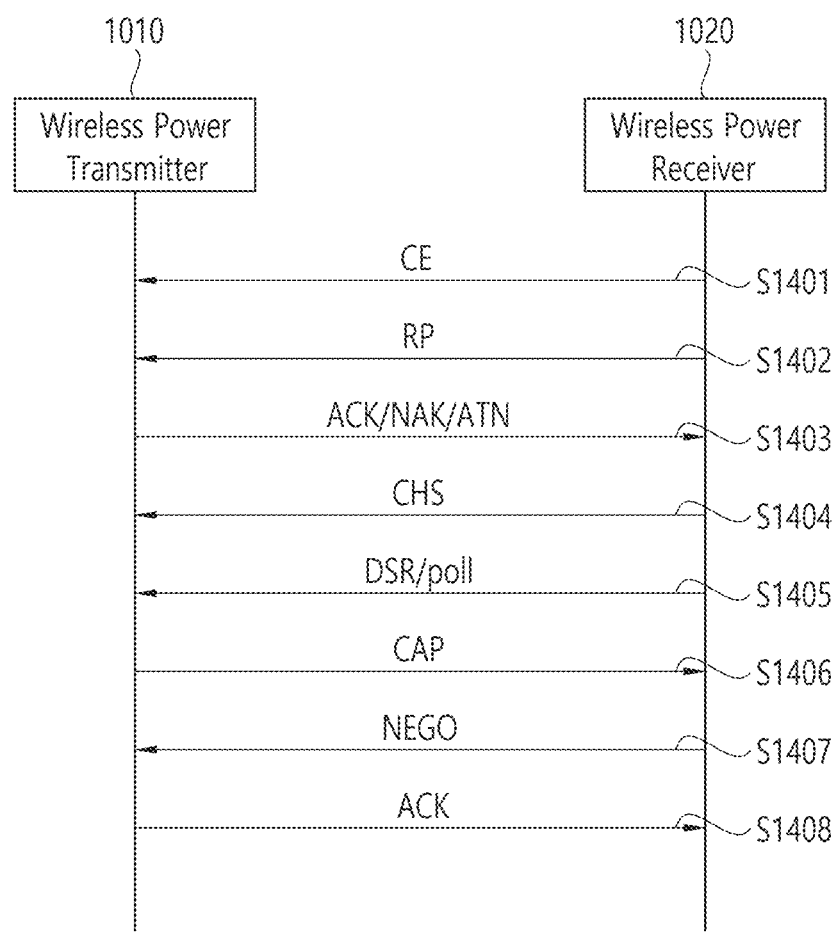
FIG. 17 is a diagram illustrating a message field of a capability packet (CAP) of a wireless power transmission device according to an embodiment.
FIG. 18 is a flowchart schematically showing the protocol of the power transfer phase according to one embodiment.

The configuration packet (CFG) according to one embodiment may have a header value of 0x51 and, referring to FIG. 18, may include a 5-byte message field.

Referring to FIG. 15, the message field of the configuration packet (CFG) may include a 1-bit authentication (AI) flag and a 1-bit outband (OB) flag.

The authentication flag (AI) indicates whether the wireless power receiving device 1020 supports the authentication function. For example, if the value of the authentication flag (AI) is '1', it indicates that the wireless power receiving device 1020 supports the authentication function or can operate as an authentication initiator, if the value of the authentication flag (AI) is '0', it may indicate that the wireless power receiving device 1020 does not support the authentication function or cannot operate as an authentication initiator.

The out-of-band (OB) flag indicates whether the wireless power receiver 1020 supports out-of-band communication. For example, if the value of the out-band (OB) flag is '1', the wireless power receiver 1020 instructs out-band communication, if the value of the out-of-band (OB) flag is '0', it may indicate that the wireless power receiver 1020 does not support out-of-band communication.

In the configuration phase, the wireless power transmitter 1010 receives the configuration packet (CFG) of the wireless power receiver 1020, the wireless power transmitter 1010 can check whether the wireless power receiver 1020 supports the authentication function and whether out-of-band communication is supported.

FIG. 16 is a flowchart schematically showing a protocol of a negotiation phase or re-negotiation phase according to an embodiment.

In the negotiation phase or re-negotiation phase, the Power Transfer Contract related to the reception/transmission of wireless power between a wireless power receiving device and a wireless power transmitting device is expanded or changed, or a renewal of the power transmission contract may be made to adjust at least some of the elements of the power transmission contract, or information may be exchanged to establish out-of-band communication.

Referring to FIG. 16, in the negotiation phase, the wireless power receiving device 1020 can receive the ID (Identification data packet) and CAP (Capabilities data packet) of the wireless power transmitting device 1010 using a General Request data packet (GRQ).

The general request packet (GRQ) may have a header value of 0x07 and may include a 1-byte message field. The message field of the general request packet (GRQ) may include the header value of the data packet that the wireless power receiving device 1020 requests from the wireless power transmitting device 1010 using the GRQ packet. For example, when the wireless power receiving device 1020 requests an ID packet of the wireless power transmitting device 1010 using a GRQ packet, the wireless power receiving device 1020 transmits a general request packet (GRQ/id) including the header value (0x30) of the ID packet of the wireless power transmitting device 1010 in the message field of the general request packet (GRQ).

Referring to FIG. 16, in the negotiation phase or re-negotiation phase, the wireless power receiving device 1020 may transmit a GRQ packet (GRQ/id) requesting an ID packet of the wireless power transmitting device 1010 to the wireless power transmitting device 1010 (S1301).

The wireless power transmission device 1010 that has received the GRQ/id may transmit an ID packet to the wireless power reception device 1020 (S1302). The ID packet of the wireless power transmitter 1010 includes information about the manufacturer code. The ID packet containing information about the Manufacturer Code allows the manufacturer of the wireless power transmission device 1010 to be identified.

Referring to FIG. 16, in the negotiation phase or re-negotiation phase, the wireless power receiving device 1020 may transmit a GRQ packet (GRQ/cap) requesting a capability packet (CAP) of the wireless power transmitting device 1010 to the wireless power transmitting device 1010 (S1303). The message field of GRQ/cap may include the header value (0x31) of the capability packet (CAP).

The wireless power transmitter 1010 that has received the GRQ/cap may transmit a capability packet (CAP) to the wireless power receiver 1020 (S1304).

FIG. 17 is a diagram illustrating a message field of a capability packet (CAP) of a wireless power transmission device according to an embodiment.

Figure 20:
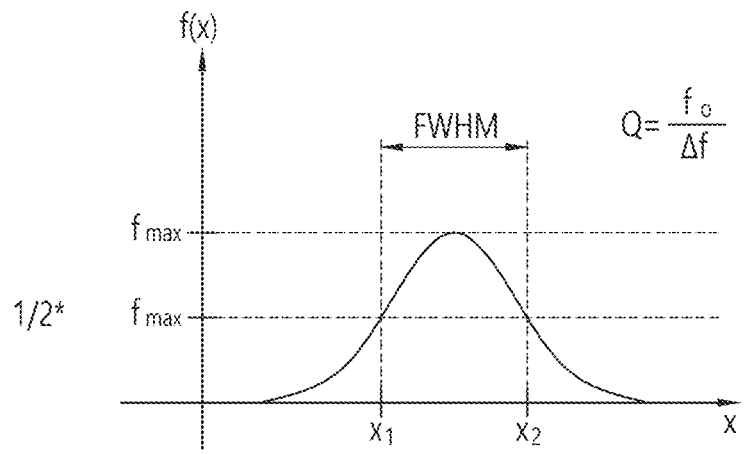
FIGS. 20 and 21 show examples of measurement/calculation of quality factors.

A capability packet (CAP) according to one embodiment may have a header value of 0x31 and, referring to FIG. 20, may include a 3-byte message field.

Referring to FIG. 17, the message field of the capability packet (CAP) may include a 1-bit authentication (AR) flag and a 1-bit outband (OB) flag.

The authentication flag (AR) indicates whether the wireless power transmitter 1010 supports the authentication function. For example, if the value of the authentication flag (AR) is '1', it indicates that the wireless power transmitter 1010 supports the authentication function or can operate as an authentication responder, if the value of the authentication flag (AR) is '0', it may indicate that the wireless power transmitter 1010 does not support the authentication function or cannot operate as an authentication responder.

The outband (OB) flag indicates whether the wireless power transmitter 1010 supports outband communication. For example, if the value of the out-band (OB) flag is '1', the wireless power transmitter 1010 instructs out-band communication, if the value of the out-of-band (OB) flag is '0', it may indicate that the wireless power transmitter 1010 does not support out-of-band communication.

In the negotiation phase, the wireless power receiver 1020 receives the capability packet (CAP) of the wireless power transmitter 1010, the wireless power receiving device 1020 can check whether the wireless power transmitting device 1010 supports the authentication function and whether out-of-band communication is supported.

Also, referring to FIG. 16, in the negotiation phase or re-negotiation phase, using at least one specific request packet (SRQ, Specific Request data packet), the wireless power receiving device 1020 may update elements of a power transfer contract related to power to be provided in the power transfer phase and may end the negotiation phase or re-negotiation phase (S1305).

The wireless power transmitter 1010 transmits only ACK in response to a specific request packet (SRQ) depending on the type of the specific request packet (SRQ), or it transmits only ACK or NAK, or it can transmit only ACK or ND (S1306).

Data packets or messages exchanged between the wireless power transmitter 1010 and the wireless power receiver 1020 in the ping phase, configuration phase, and negotiation/renegotiation phase described above may be transmitted/received through in-band communication.

Although not shown separately, in order to expand the CAP packet, an XCAP packet, which is information about the capabilities of the wireless power transmitter, may be provided separately. Here, the XCAP packet may include a 1-bit out-of-band (OB) flag, similar to CAP.

FIG. 18 is a flowchart schematically showing the protocol of the power transfer phase according to one embodiment.

In the power transfer phase, the wireless power transmitter 1010 and the wireless power receiver 1020 can transmit/receive wireless power based on a power transfer contract.

Referring to FIG. 18, in the power transfer phase, the wireless power receiving device 1020 transmits a control error data packet (CE) containing information about the difference between the actual operating point and the target operating point to the wireless power transmitting device 1010 (S1401).

Additionally, in the power transfer phase, the wireless power receiving device 1020 transmits a received power packet (RP, Received Power data packet) containing information about the received power value of the wireless power received from the wireless power transmitter 1010 to the wireless power transmitting device 1010 (S1402).

In the power transfer phase, control error packets (CE) and received power packets (RP) are data packets that must be repeatedly transmitted/received according to the required timing constraints to control wireless power.

The wireless power transmitter 1010 can control the level of wireless power transmitted based on the control error packet (CE) and received power packet (RP) received from the wireless power receiver 1020.

The wireless power transmitter 1010 may respond to the received power packet (RP) with an 8-bit bit pattern such as ACK, NAK, and ATN (S1403).

The fact that the wireless power transmitter 1010 responds with ACK to a received power packet (RP/0) with a mode value of 0 means that power transmission can continue at the current level.

The fact that the wireless power transmitter 1010 responds with NAK to a received power packet (RP/0) with a mode value of 0 means that the wireless power receiver 1020 must reduce power consumption.

For received power packets (RP/1 or RP/2) with a mode value of 1 or 2, when the wireless power transmitter 1010 responds with ACK, it means that the wireless power receiver 1020 has accepted the power correction value included in the received power packet (RP/1 or RP/2).

For received power packets (RP/1 or RP/2) with a mode value of 1 or 2, when the wireless power transmitter 1010 responds with NAK, it means that the wireless power receiver 1020 did not accept the power correction value included in the received power packet (RP/1 or RP/2).

When the wireless power transmission device 1010 responds with ATN to the received power packet (RP), it means that the wireless power transmission device 1010 requests permission for communication.

The wireless power transmitter 1010 and the wireless power receiver 1020 can control the transmitted/received power levels based on control error packets (CE), received power packets (RP), and responses to received power packets (RP).

Additionally, in the power transfer phase, the wireless power receiving device 1020 transmits a charge status packet (CHS) containing information about the charging state of the battery to the wireless power transmitting device 1010 (S1404). The wireless power transmitter 1010 can control the power level of wireless power based on information about the charging state of the battery included in the charging status packet (CHS).

Meanwhile, in the power transfer phase, the wireless power transmission device 1010 and/or the wireless power reception device 1020 may enter the re-negotiation phase to renew the power transfer contract.

In the power transfer phase, when the wireless power transmitter 1010 attempts to enter the re-negotiation phase, the wireless power transmitter 1010 responds to the received power packet (RP) with ATN. In this case, the wireless power receiving device 1020 may transmit a DSR/poll packet to the wireless power transmitting device 1010 to give the wireless power transmitting device 1010 an opportunity to transmit a data packet (S1405).

When the wireless power transmitter 1010 transmits a capability packet (CAP or XCAP) to the wireless power receiver 1020 in response to the DSR/poll packet (S1406), the wireless power receiver 1020 transmits a renegotiation packet (NEGO) requesting the re-negotiation phase to proceed to the wireless power transmitter 1010 (S1407), when the wireless power transmitter 1010 responds with ACK to the renegotiation packet (NEGO) (S1408), the wireless power transmitter 1010 and the wireless power receiver 1020 enter the renegotiation phase.

In the power transfer phase, when the wireless power receiving device 1020 wants to enter the re-negotiation phase, the wireless power receiver 1020 transmits a renegotiation packet (NEGO) requesting the re-negotiation phase to proceed to the wireless power transmitter 1010 (S1407), when the wireless power transmitter 1010 responds with ACK to the renegotiation packet (NEGO) (S1408), the wireless power transmitter 1010 and the wireless power receiver 1020 enter the renegotiation phase.

Meanwhile, the wireless power transmission system may be equipped with an application layer message exchange function to support expansion into various application fields. Based on this function, device authentication-related information or other application-level messages can be transmitted and received between the wireless power transmitter 1010 and the wireless power receiver 1020. In order to exchange upper layer messages between the wireless power transmitter 1010 and the wireless power receiver 1020, a separate hierarchical architecture is required for data transmission, an efficient management and operation method for hierarchical architecture is required.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Meanwhile, in wireless charging, the presence of a foreign object between the wireless power transmitter and the wireless power receiver may pose a risk to wireless charging between the wireless power transmitter and the wireless power receiver.

This is because, due to the generation of a magnetic field between the wireless power transmitter and the wireless power receiver, heat is generated in a foreign object existing between them, thereby reducing charging efficiency. In addition, in addition to simply reducing charging efficiency, the heat generated by the foreign object may cause the wireless power transmitter and/or wireless power receiver to malfunction.

Accordingly, the wireless power transfer system provides a protocol for foreign object detection, and the WPC provides calibration procedures and measurement of quality factor (Q-factor).

Below, the calibration procedure will be described.

Figure 19:
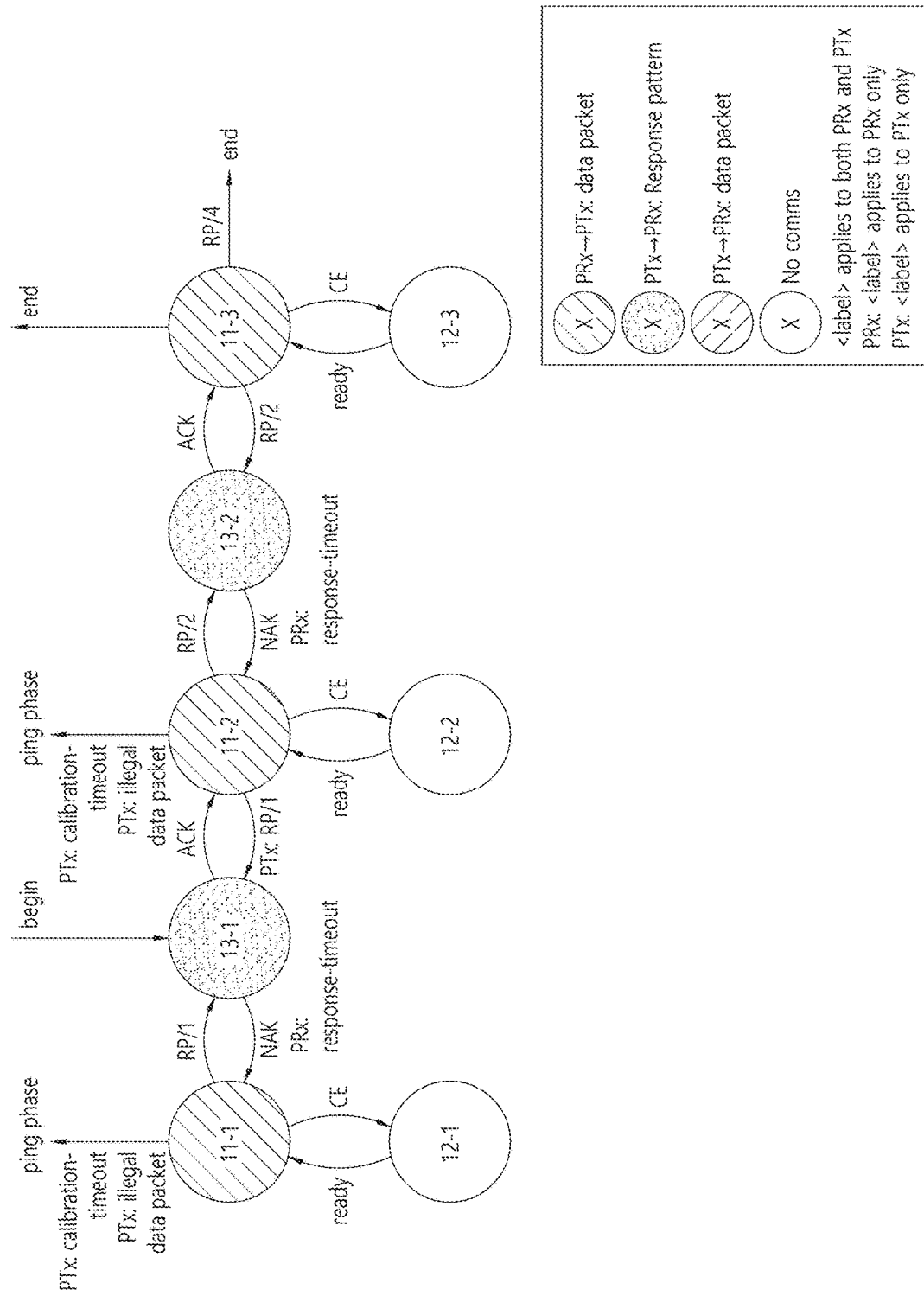
FIG. 19 schematically shows an example calibration protocol.

FIG. 19 schematically shows an example calibration protocol.

According to FIG. 19, the wireless power transmitter can roughly understand foreign object insertion based on power loss during wireless power transfer.

In state 11-1, the wireless power receiver may transmit RP/1 to the wireless power transmitter. Additionally, in state 11-1, the wireless power receiver may transmit CE to the wireless power transmitter.

When the wireless power transmitter receives RP/1 from the wireless power receiver, it enters state 13-1. In state 13-1, the wireless power transmitter may transmit an ACK to the wireless power receiver.

When the wireless power receiver receives the above ACK, it enters state 11-2. In state 11-2, the wireless power receiver may transmit RP/2 to the wireless power transmitter and also transmit CE to the wireless power transmitter.

When the wireless power transmitter receives RP/2 from the wireless power receiver, it enters state 13-2. In state 13-2, the wireless power transmitter may transmit an ACK to the wireless power receiver.

When the wireless power receiver receives the above ACK, it enters state 11-3. In state 11-3, the wireless power receiver may additionally transmit RP/2 to the wireless power transmitter, or may transmit RP/0 or RP/4. In addition, even in this state, the wireless power receiver can transmit CE to the wireless power transmitter.

In summary, when starting charging, the wireless power receiver can send light load information (RP/1) and heavy load information (RP/2) packets to the wireless power transmitter, the wireless power transmitter can perform calibration based on this data.

The wireless power transmitter can estimate power loss during charging based on the above calibration data and the power information (e.g. RP/0 or RP/4) value sent from the wireless power receiver.

Here, if the power loss is greater than the threshold, the wireless power transmitter may determine that there is FO and stop charging.

Hereinafter, the measurement of quality factor (Q-factor) will be described.

Figure 21:
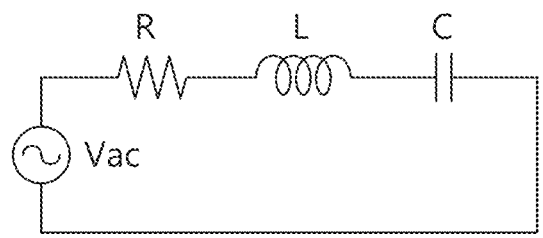

FIGS. 20 and 21 show examples of measurement/calculation of quality factors.

The quality factor, that is, the Q-factor, in FIGS. 20 to 21 is wL/R, it corresponds to a physical property used to find the resistance (R) component under given inductance (L) and frequency (w) conditions. Additionally, the above quality factor may be a value used for foreign object detection (FOD) between a wireless power transmitter and a wireless power receiver.

More specifically, the wireless power receiver may remember the value of its reference Q factor in advance and transmit the reference Q factor value to the wireless power transmitter through a packet in the negotiation phase. At this time, the value of the reference Q factor may be transmitted from the wireless power receiver to the wireless power transmitter through FOD/xx (e.g. FOD/rf, FOD/qf) in the negotiation phase, for example.

A wireless power transmitter can measure the Q-factor by generating a small signal before wireless charging (i.e., before power delivery). In addition, the wireless power transmitter can determine whether FOD exists by comparing the Q factor value measured by the wireless power transmitter with the value reported by the wireless power receiver (for example, the reference Q-factor value).

So far, we have described a foreign material detection technique based on calibration during wireless power transfer and a foreign material detection technique based on quality factors before wireless power transfer.

However, despite the existence of external substance detection techniques such as the method described above, there are limitations to the above external substance detection techniques.

First, according to the foreign matter detection technique by calibration during wireless power transfer, as shown in FIG. 19, since calibration is performed only once at the start of charging, despite the possibility of a change in alignment between the wireless power transmitter and wireless power receiver during charging, the wireless power transmitter and/or wireless power receiver will not be able to detect this.

As above, since the validity of the calibration data (when the alignment is changed) disappears, the wireless power transmitter and/or wireless power receiver performs FOD with an incorrect reference value. And, because of this, the wireless power transmitter and/or wireless power receiver are exposed to the risk of IOP failure due to pulse positive FOD (False Positive FOD) and the risk of heating due to pulse negative FOD (False Negative FOD).

In addition, according to the material detection technique based on the quality factor before wireless power transfer, as shown in FIG. 20, since there is a difference of 1 to 2 seconds between the measurement time of the Q factor and the judgment time of FOD, there is a problem that FO may be inserted within the above time (1 to 2 seconds), which is a relatively long time from the wireless charging point of view.

Accordingly, the present specification seeks to provide a method for quickly and accurately determining whether FO is inserted into wireless power transmission by measuring the quality factor even during wireless power transmission. And, in this specification, not only the quality factor during wireless power transfer, by further measuring the coupling factor between the wireless power transmitter and the wireless power receiver, the specification seeks to provide a method for determining whether the alignment between the wireless power transmitter and the wireless power receiver is simply disturbed.

The following drawings were prepared to explain a specific example of the present specification. Since the names of specific devices or specific signals/messages/fields described in the drawings are provided as examples, the technical features of this specification are not limited to the specific names used in the drawings below.

Figure 22:
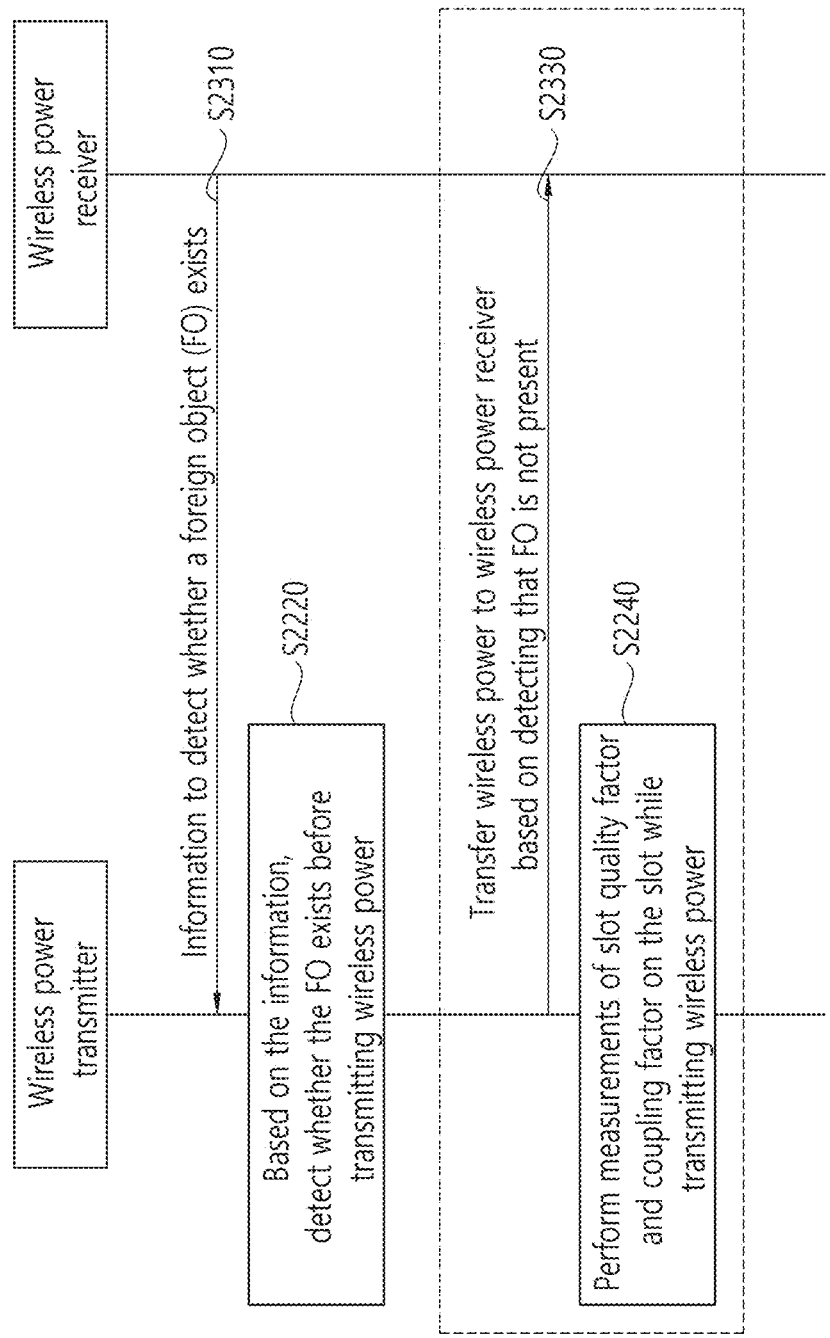
FIG. 22 is a flowchart of a method for measuring a slot quality factor and a coupling factor on a slot while transmitting wireless power, according to an embodiment of the present specification.

FIG. 22 is a flowchart of a method for measuring a slot quality factor and a coupling factor on a slot while transmitting wireless power, according to an embodiment of the present specification.

According to FIG. 22, the wireless power transmitter may receive information for detecting whether a foreign object (FO) exists from the wireless power receiver (S2210).

Here, the information for detecting whether the FO received by the wireless power transmitter exists may be the FOD status information (e.g., FOD/rf, FOD/qf) described above.

FOD status information received by the wireless power transmitter may include type information and FOD support data, if the type information indicates 0, the FOD status information may be FOD/qf, and if the type information indicates 1, the FOD status information may be FOD/rf.

FOD support data can be determined according to the value included in the type information.

Specifically, in the case of FOD/qf, FOD support data may include a reference quality factor, in the case of FOD/rf, FOD support data may include a reference resonance frequency.

The wireless power transmitter can detect whether FO exists before transmitting wireless power based on the above information (S2220).

For example, the wireless power transmitter can detect/determine the presence of FO based on the quality factor measured by the wireless power transmitter, the resonance frequency measured by the wireless power transmitter, the reference quality factor received from the wireless power receiver, and/or the reference resonance frequency received from the wireless power receiver.

Thereafter, the wireless power transmitter may transmit wireless power to the wireless power receiver based on detecting that the FO does not exist (S2230).

Here, the wireless power transmitter can measure the slot quality factor and coupling factor on the slot while transmitting wireless power (S2240).

Afterwards, the wireless power receiver may be detected whether an FO is inserted between the wireless power transmitter and the wireless power receiver and/or whether the alignment between the wireless power transmitter and the wireless power receiver changes based on the measurements of the slot quality factor and coupling factor above.

Here, for example, when FO is detected during wireless power transfer, the wireless power transmitter and/or wireless power receiver may reduce the transmitted power. By way of example, the wireless power transmitter and/or wireless power receiver may lower the power transfer agreement within the EPP if it detects FO during wireless power transfer. However, this specification does not exclude lowering the power transmission contract from EPP to BPP from the scope of rights.

Meanwhile, for example, when only a change in alignment is detected during wireless power transfer, the wireless power transmitter and/or wireless power receiver may continue to perform existing power transfer. That is, if only changes in alignment are detected, because changes in alignment do not significantly affect the safety between the wireless power transmitter and wireless power receiver, the wireless power transmitter and wireless power receiver can perform wireless charging based on the previously contracted power transfer value.

In the following, the components provided in this specification will be described separately. First, let's explain what a slot is through drawings.

Slot

Figure 23:
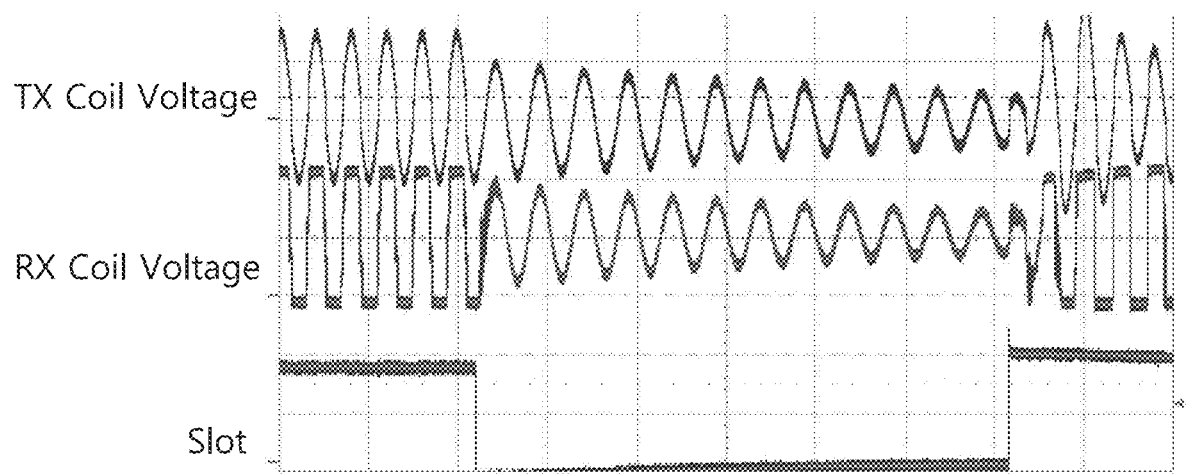
FIG. 23 schematically shows a slot, according to an example herein.

FIG. 23 schematically shows a slot, according to an example herein.

According to FIG. 23, the slot may mean a section in which the TX stops driving the coil and the voltage decreases. To explain it another way, a slot can refer to a section where charging is temporarily interrupted.

Here, the section length of the slot may be determined according to the frequency and number of waveforms. For example, as shown in FIG. 23, the length of the slot section can be determined to be a section in which approximately 10 or more waveforms in which the voltage of the coil attenuates at the natural frequency occur.

And, in the time dimension, the section length of the above slot may be determined based on a section of about 100 us to 200 us, for example.

With the slot defined as above, the wireless power transmitter can measure the slot quality factor and/or coupling factor as described above.

Slot Quality Factor

Here, the slot quality factor (slot Q-factor) can be derived by calculating the quality factor (Q-factor) during the slot section, as previously described in FIGS. 20 and 21. That is, the wireless power transmitter can calculate the slot quality factor by calculating wL/R during the slot period.

Since the details of calculating the quality factor are the same as previously described in FIGS. 20 and 21, the details of calculating the coupling factor by the wireless power transmitter will be described in more detail below.

Coupling Factor

The coupling factor may be a factor that indicates how well the wireless power transmitter and the wireless power receiver are coupled, that is, how well the distance or angle between the wireless power transmitter and the wireless power receiver is aligned.

Here, the coupling factor (k) can be defined through the formula below.

$$k = \frac{L_{12}}{\sqrt{L_{11} \cdot L_{22}}} \qquad < \text{Equation 1} >$$

Here, L_12 may mean the value of the inductance when the wireless power transmitter and wireless power receiver are combined. In addition, L_11 may mean the value of the independent inductance of the coil in the wireless power transmitter. Additionally, L_22 may refer to the value of the single inductance of the coil in the wireless power receiver.

Meanwhile, if Equation 1 above is rearranged as the formulas below, the coupling factor may be defined based on the voltage at the wireless power transmitter, the voltage at the wireless power receiver, the inductance at the wireless power transmitter, and the inductance at the wireless power receiver.

The formula below summarizes the voltage applied to the coupled inductor.

$$\frac{U_1}{j \cdot \omega} = L_{11} \cdot I_1 + L_{12} \cdot I_2 \qquad < \text{Equation 2} >$$

$$\frac{U_2}{j \cdot \omega} = L_{12} \cdot I_1 + L_{22} \cdot I_2$$

Here, U_1 may mean the difference in voltage between both ends of the TX coil, or in other words, may also be named V_1. U_2 can refer to the difference in voltage between both ends of the RX coil, or in other words, can also be named V_2.

In the situation of Equation 1 and Equation 2 above, if the operation of TX stops in the slot, the current of RX may become 0. If the above equations 1 and 2 are summarized in a situation where the current is 0, the following equation can be derived.

$$u = \frac{U_2}{U_1} = k \sqrt{\frac{L_2}{L_1}} \qquad < \text{Equation 3} >$$

That is, if the voltages U1 and U2 applied to each of the TX and RX coils in the slot, and the L value of each of the RX and TX coils are known, the wireless power transmitter and/or wireless power receiver can know the current K.

In the situation of the above formula, an example of calculating/determining/measuring the coupling factor (and/or alignment) in the slot is explained in more detail as follows.

If the TX stops driving the coil during charging and creates a slot that creates a closed loop state, the wireless power transmitter and/or wireless power receiver can calculate K by measuring the voltage values of the TX and RX coils at that time.

Here, RX can provide a self-inductance (L2) value to TX, during charging, the wireless power receiver can measure the difference (U2) in voltage across the RX coil in the slot section and provide the measured value to the wireless power transmitter. Hereinafter, the wireless power transmitter receiving L2 and U2 from the wireless power receiver will be described.

The RX side L2 value may be transmitted from the wireless power receiver to the wireless power transmitter through a configuration packet (in the configuration phase). Alternatively, the L2 value may be transmitted from the wireless power receiver to the wireless power transmitter through a new packet defined in the negotiation phase.

If the wireless power transmitter does not receive the L2 value of the RX side from the wireless power receiver, a wireless power transmitter (or wireless power receiver) may calculate a relative k value and enable detection of a change in position using the relative k value change.

The wireless power receiver may indicate slot Q to the wireless power transmitter with an RPP packet (i.e. RP packet), and then measure the change in voltage/current across the coil to detect the PTx slot timing (e.g., slot section). That is, the wireless power receiver can trigger slot Q to the wireless power transmitter. In other words, based on being triggered from the wireless power receiver, the wireless power transmitter can measure the Q value and K value on the slot.

(Based on detection of slot timing) The wireless power receiver may measure the voltage difference and current values across the coil of the wireless power receiver when a slot starts and transmit the measured values to the wireless power transmitter.

After, the wireless power transmitter can calculate K or relative K by measuring the L2 and U2 values received from RX, its own self-inductance (L1) value, and the difference (U1) between the voltage between both ends of the TX coil in the slot section.

Here, when the wireless power transmitter checks the current value received (i.e. transmitted) from the wireless power receiver, if the above current value is not '0', the wireless power transmitter may determine that the slot Q and K measured by the wireless power transmitter are not accurately measured (due to noise in the circuit, etc.). And, the wireless power transmitter does not use the corresponding values (values for the slot quality factor and coupling factor measured when the current value is not 0).

Meanwhile, in calibration performed at the beginning of charging, the initial K value can be secured in the same way as above. Afterwards, additional K value can be secured through the slot while charging. In general, the K value can change sensitively depending on changes in alignment. If the K value is different compared to when calibration data was obtained, it is possible to estimate that the alignment (in other words, charging conditions) has changed and request (TX) re-calibration.

As above, when the wireless power transmitter measures the slot quality factor (i.e., slot Q-factor) and the coupling factor, how to use them will be explained below.

Utilization of Slot Quality Factor and/or Coupling Factor

If the wireless power transmitter considers the change in K measured in the slot and the change in Q measured in the slot together, the change in K due to FO insertion and the change in K due to alignment change can be more clearly determined.

The basis for this judgment is that the (slot) Q value changes less compared to the K value when alignment changes, and that the K value responds to both alignment and FO insertion.

In other words, based on the following points that even if the alignment changes, the change in the value of slot Q is not large, but when the alignment changes, the change in the K value is relatively large, the wireless power transmitter can determine whether an FO has occurred (inserted) during wireless power transfer or whether the alignment with the wireless power receiver is simply disturbed.

That is, the wireless power transmitter can measure both values (slot Q value and K value) in the slot to determine whether the change in K is an effect of FO or alignment.

Through the drawings, a configuration in which a wireless power transmitter measures both slots Q and K to determine whether FO is inserted or misaligned during wireless power transfer will be described.

Figure 24:
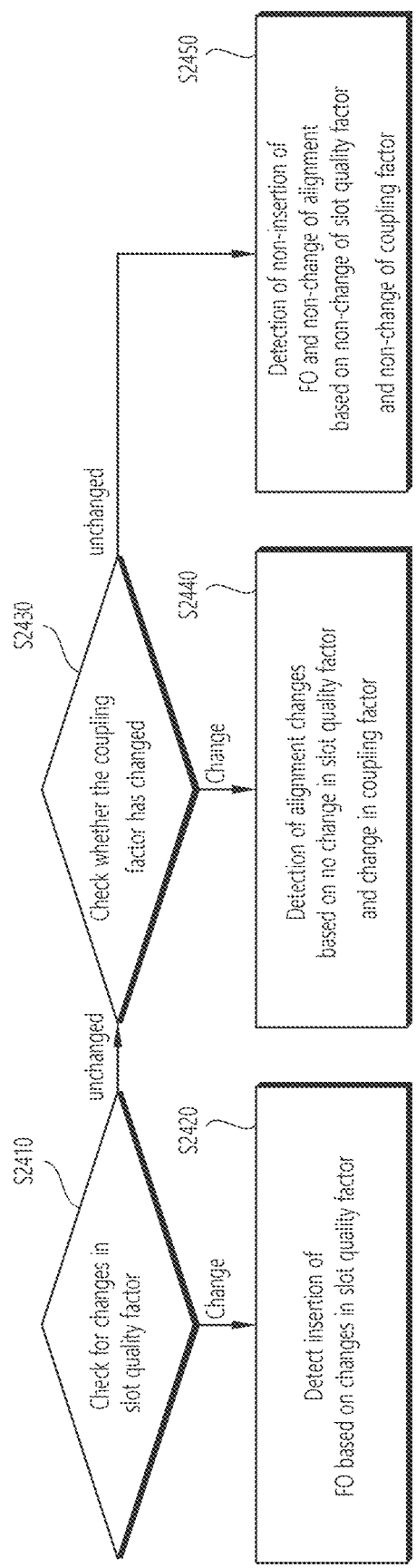
FIG. 24 is a flowchart of a method for measuring slot quality factor and coupling factor on a slot while transmitting wireless power, according to another embodiment of the present specification.

FIG. 24 is a flowchart of a method for measuring slot quality factor and coupling factor on a slot while transmitting wireless power, according to another embodiment of the present specification.

According to FIG. 24, the wireless power transmitter can check whether the slot quality factor changes (S2410). Here, checking whether the slot quality factor has changed means, for example, this may mean comparing the value of the quality factor measured before the wireless power transmitter transmits wireless power and the value of the slot quality factor measured while transmitting wireless power.

If the value of the slot quality factor changes compared to the value of the quality factor measured before wireless power transmission, the wireless power transmitter can detect insertion of the FO based on the change in the slot quality factor (S2420). And, when FO is detected, as described above, the wireless power transmitter can reduce the amount of power delivered to the wireless power receiver.

Meanwhile, if the value of the slot quality factor does not change compared to the value of the quality factor measured before wireless power transmission, the wireless power transmitter can check whether the coupling factor has changed (S2430). Here, checking whether the slot quality factor has changed means, for example, this may mean comparing the initial K value measured during calibration performed at the beginning of charging as described above with the K value measured on the slot during wireless power transfer.

If the value of the coupling factor changes compared to the value of the initial coupling factor before wireless power transfer, the wireless power transmitter can detect that the alignment has changed (S2440). Here, when it is detected that only the alignment between the wireless power transmitter and the wireless power receiver has changed, wireless power transfer can be performed based on the existing (negotiated) contracted power transfer value as described above.

Meanwhile, if the value of the coupling factor also does not change compared to the value of the initial coupling factor, the wireless power transmitter can detect non-insertion of the FO and no change in alignment (S2450). In this case, since there is no major problem in power transfer between the wireless power transmitter and the wireless power receiver, power transfer can be performed based on an existing (negotiated) power transfer contract.

Hereinafter, for convenience of understanding, an example of detecting a change in the detection and alignment of the FO will be described using the drawings.

FIG. 25 shows a specific example of detecting a change in detection and alignment of the FO based on the quality factor (Q before power transfer and slot Q during power transfer) and the coupling factor (K).

According to FIG. 25, when the wireless power transmitter and the wireless power receiver are aligned, for example, the value of the quality factor may be about 50 and the value of K may be about 0.5 (0.48).

In this situation, if the position of the wireless power receiver is moved by about 1 cm compared to the center, while the value of the quality factor does not change much compared to before (about 50), the value of K may change relatively more (0.48 in the middle→0.42 when moving 1 cm).

Furthermore, if the position of the wireless power receiver is moved by about 2 cm compared to the center, while the value of the quality factor does not change significantly compared to before (about 50), the value of K can change significantly (0.48 in the middle→0.27 when moving 2 cm).

In this way, when only the position of the wireless power receiver is simply moved, the value of the quality factor does not change significantly compared to the existing value, but the K value changes significantly. Using this, the wireless power transmitter can detect/determine that in the above situation, the FO has not been inserted but only the alignment has been disturbed, and perform wireless power transfer according to the previously negotiated power transfer contract.

Meanwhile, when FO is inserted, the wireless power transmitter can detect that not only the coupling factor but also the quality factor has changed significantly (50→30). In this case, the wireless power transmitter can detect that the FO is inserted and reduce the amount of transmitted power as described above.

So far, the configurations provided in this specification have been described. In the previous description, the wireless power transmitter measures the quality factor and the coupling factor, but this specification also provides an example of the wireless power receiver measuring the quality factor and the coupling factor.

Hereinafter, specific embodiments to which the configurations provided in this specification are applied will be described.

1. A Method of Varying the Charging Capacity Depending on the Number of Factors Related to FO/Quality/Sorting Provided.

In the existing case, only quality factors and factors related to charging efficiency (e.g., RP) were considered between the wireless power transmitter and the wireless power receiver.

In contrast, in this specification, for example, values for the quality factor and coupling factor in the slot may be further provided. And, when FO/quality/alignment is determined based on more factors between the wireless power transmitter and the wireless power receiver, the stability of power transfer between the wireless power transmitter and the wireless power receiver can be increased.

Accordingly, the present specification provides a method of varying the charging capacity, for example, depending on the number of factors related to FO/quality/sorting provided.

Figure 26:
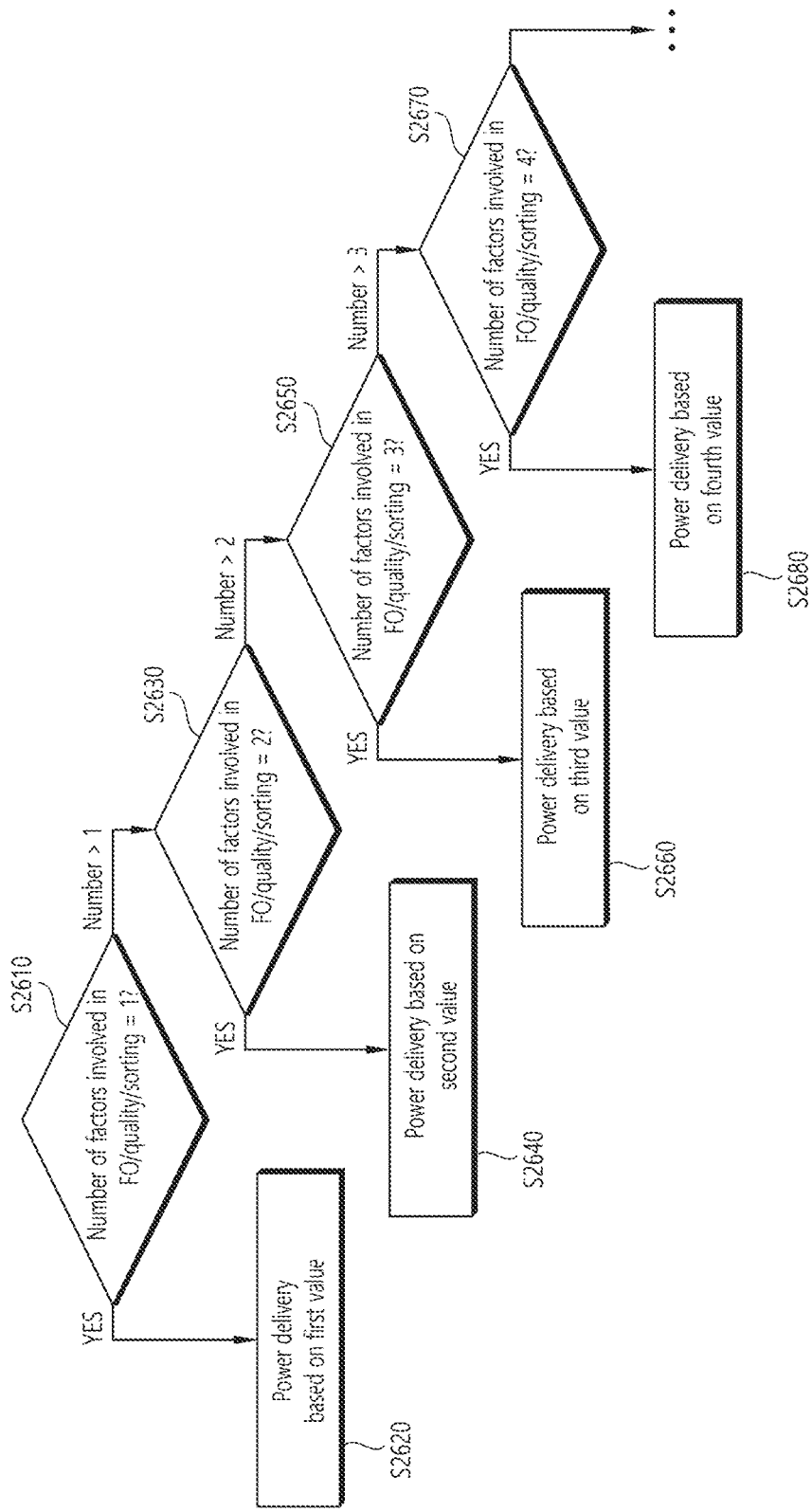
FIG. 26 is a flowchart of a method for varying the charging capacity depending on the number of factors.

FIG. 26 is a flowchart of a method for varying the charging capacity depending on the number of factors.

According to FIG. 26, the wireless power transmitter can determine whether the number of factors related to FO/quality/alignment is one (S2610).

And, when the number of factors related to FO/quality/alignment is one, the wireless power transmitter can perform wireless power transfer based on the first power (S2620).

The wireless power transmitter may determine whether the number of factors related to FO/quality/alignment is two (S2630).

And, when the number of factors related to FO/quality/alignment is two, the wireless power transmitter can perform wireless power transfer based on the second power (S2640).

The wireless power transmitter may determine whether the number of factors related to FO/quality/alignment is three (S2650).

And, when the number of factors related to FO/quality/alignment is three, the wireless power transmitter can perform wireless power transfer based on the third power (S2660).

The wireless power transmitter may determine whether the number of factors related to FO/quality/alignment is four (S2670).

And, when the number of factors related to FO/quality/alignment is one, the wireless power transmitter can perform wireless power transfer based on the fourth power (S2670).

Here, as described above, the wireless power transmitter and/or wireless power receiver may determine that as the number of factors related to FO/quality/alignment increases, the stability of power transfer between the wireless power transmitter and the wireless power receiver increases.

Accordingly, the wireless power transmitter can transmit power to the wireless power receiver based on increasingly larger power as the number of factors related to FO/quality/alignment increases. For example, in the case of the powers described above, the power becomes greater in the following order: first power<second power<third power<fourth power . . . .

As a specific example, if there is no number of factors related to FO/quality/alignment that can be used between the wireless power transmitter and the wireless power receiver, wireless charging may be performed based on the lowest power.

In addition, if measurement of charging efficiency based on quality factor and calibration before power transfer is supported between the wireless power transmitter and the wireless power receiver, power equivalent to the amount currently provided in the EPP can be transferred.

In addition, when slots Q and K, which are the configuration provided in this specification, are additionally supported between the wireless power transmitter and wireless power receiver, power greater than that provided by the current EPP can be transmitted.

Meanwhile, an embodiment of measuring the coupling factor provided in this specification may be provided when re-calibration is initiated by the wireless power transmitter.

2. Re-Calibration after Measuring K by TX

As described above, in order for the wireless power transmitter to calculate the K value, it is necessary to receive L2 and U2 (V2) from the wireless power receiver. And, in the case of the value of L2, the wireless power transmitter can receive it from the wireless power receiver in the setup phase or negotiation phase.

At this time, when measurement of slot Q is indicated (triggered), the wireless power transmitter can receive V2 (U2) from the wireless power receiver, this may be the same even when re-calibration is initiated after the K value is measured by the wireless power transmitter. Accordingly, the following will explain through drawings how the wireless power transmitter receives V2 in the case of re-calibration after measuring K by TX.

FIG. 27 schematically shows an example of detecting an alignment change and performing recalibration after measuring the K value of the TX when re-calibration is initiated by the wireless power transmitter.

According to FIG. 27, first, re-calibration by the wireless power transmitter can be initiated as follows.

The wireless power transmitter may receive RP/0 from the wireless power receiver. And, the wireless power transmitter can transmit (response) ATN to the wireless power receiver as a response to RP/0.

Afterwards, the wireless power transmitter can receive DSR/poll from the wireless power receiver, thereafter, the wireless power transmitter may request re-calibration by setting the request bit of the FOD status data packet to 're-calibration request' and transmitting it to the wireless power receiver.

After transmitting the FOD status data packet, the wireless power transmitter can perform the steps related to calibration described above. Additionally, the wireless power transmitter may perform the FOD function by estimating power loss based on newly acquired calibration data (e.g., RP values).

In order to calculate the K value before starting re-calibration, how V2 of the wireless power receiver will be transmitted to the wireless power transmitter can be defined as follows.

- A new packet has been added, and V2 can be transmitted through the new packet. The packet at this time may be the first packet that exists immediately after the slot.
- V2 can be transmitted using the first CE packet after the slot. Meanwhile, considering that CE is a packet frequently transmitted to the wireless power transmitter, in this way, when V2 is transmitted through CE, there may be an advantage in that the wireless power transmitter can frequently check the V2 value and calculate a precise K value.
- V2 can be transmitted using the reserved bits of RP. Here, considering that RP is information that triggers the measurement of the quality factor and/or coupling factor in the slot, in this way, when V2 is transmitted through RP, there is an advantage that protocol unity can be secured. In addition, since there are reserved bits in the RP, when V2 is transmitted through the RP, there may be an advantage in that there is less impact on the spec.

Meanwhile, when the wireless power transmitter transmits the FOD status data packet to the wireless power receiver, that is, when the wireless power receiver receives the FOD status data packet, the following embodiments may be provided for the operation of the wireless power receiver.

3. Operation of Wireless Power Receiver Receiving FOD Status Data Packet

First, the FOD status data packet will be described in more detail through the drawings.

FIG. 28 schematically shows an example of an FOD status data packet.

According to FIG. 28, the FOD status data packet may have a header code of, for example, 0x01. Also, the FOD status data packet at this time may include information about the FO presence probability. In addition, the FOD status data packet may include request information.

First, to explain the request information, for example, if the value of the request information is 0, reporting can simply be instructed. If the value of the request information is 1, extended calibration may be requested, and in this case, the requested information (i.e., information that the wireless power transmitter wishes to receive) may be, for example, RP/2. Additionally, if the value of the request information is 2, re-calibration may be requested, and at this time, the requested information (i.e., information that the wireless power transmitter wishes to receive) may be RP/1 . . . RP/2. If the value of the request information is 3, it may be a reserved value. That is, if the value of the request information is 3, it may be undefined.

Meanwhile, when the wireless power transmitter (or wireless power receiver) checks whether there is a FO, the presence or absence of the FO may not be clearly distinguished only by presence/absence. In other words, the existence of FO can be expressed in the form of a kind of probability.

In this situation, the wireless power transmitter directly makes a judgment on the above probability and determines whether the FO exists in one of two ways: presence or absence, transmitting this to a wireless power receiver may not be desirable from a wireless power transfer perspective.

For that reason, from the point of view of a wireless power receiver, one may wish to receive wireless power even if the probability of FO existence is somewhat high, or, even if the probability of FO existence is low, the wireless power receiver may not want to receive wireless power to protect its own device.

Accordingly, as shown in FIG. 28, the wireless power transmitter may include information about the probability of FO existence in the FOD status data packet and transmit it to the wireless power receiver.

The above contents can be summarized in the form of a flowchart as follows.

Figure 29:
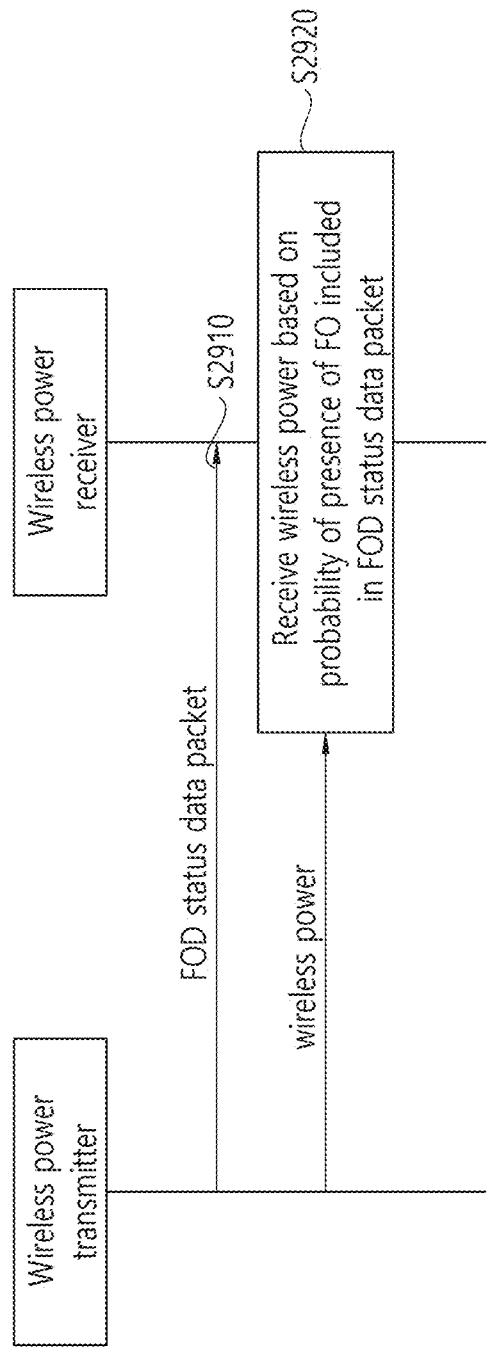
FIG. 29 is a flowchart of a method of receiving wireless power based on the probability of FO existence, according to an embodiment of the present specification.

FIG. 29 is a flowchart of a method of receiving wireless power based on the probability of FO existence, according to an embodiment of the present specification.

According to FIG. 29, the wireless power receiver can receive a FOD status data packet from the wireless power transmitter (S2910). Here, the FOD status data packet may include information about the probability of FO existence as described above, and may also include request information. Here, specific examples of information on the probability of FO existence and request information are as described above.

Thereafter, the wireless power receiver may receive wireless power based on information about the probability of FO existence included in the FOD status data packet (S2920).

For example, if the FO existence probability indicated by the information about the FO existence probability received by the wireless power receiver is lower than (or equal to or lower than) the threshold value for the probability that the wireless power receiver can receive wireless power, the wireless power receiver determines that FO does not exist, and subsequent procedures may be performed accordingly (e.g., receiving wireless power from a wireless power transmitter).

Conversely, if the FO existence probability indicated by the information about the FO existence probability received by the wireless power receiver is higher (or equal to or higher) than the threshold value for the probability that the wireless power receiver can receive wireless power, the wireless power receiver determines that FO exists, subsequent procedures may be performed accordingly (e.g., not receiving wireless power from the wireless power transmitter).

As a specific example, when the wireless power receiver is instructed by the wireless power transmitter that the probability of FO existence is 50%, the wireless power receiver that is tolerant of the existence of FO determines that FO does not exist, wireless power can be received from a wireless power transmitter. Conversely, if the wireless power receiver is instructed by the wireless power transmitter that the probability of FO existence is 50%, the wireless power receiver that is strict about the existence of FO determines that FO exists, wireless power may not be received from the wireless power transmitter.

Here, when the wireless power receiver in this embodiment decides to receive wireless power, as explained earlier, during power transfer, the wireless power receiver can transmit the voltage (e.g. V2) of the wireless power receiver to the wireless power transmitter, based on this, the wireless power transmitter can measure/calculate/determine slot-Q and K values even during power transfer. Here, the wireless power receiver may transmit the value of its inductance (e.g. L2) to the wireless power transmitter in the setup phase or negotiation phase as described above. Specific examples of this content are as described above.

As previously described, when the wireless power receiver receives information about the probability of FO presence, and based on this information, the wireless power receiver determines whether to receive power, the wireless power receiver can only receive power that it can handle. That is, according to the above-described embodiment, an advantage arises in device protection of the wireless power receiver.

Meanwhile, as described above, the wireless power transmitter can calculate the coupling factor and determine whether the wireless power transmitter is FO and whether the alignment has changed based on this. However, as in the previous description, the wireless power transmitter is not the only device that determines whether there is FO or whether the alignment has changed. That is, the wireless power receiver can also determine whether FO exists and whether the alignment has changed.

Hereinafter, we will describe how the wireless power receiver detects/determines whether FO is present and whether the alignment is changed.

4. The Wireless Power Receiver Receives the K Value Calculated by the Wireless Power Transmitter.

First, a method may be provided in which the wireless power transmitter calculates the K value as described above and transmits it to the wireless power receiver. An example of this is shown in FIG. 30.

FIG. 30 schematically shows how a wireless power receiver receives information about K from a wireless power transmitter.

According to (a) of FIG. 30, the wireless power receiver can switch from the power transfer phase to the renegotiation phase and receive the K value using a GRQ packet.

More specifically, the wireless power receiver may initiate the re-negotiation phase by transmitting a NEGO packet to the wireless power transmitter during the power transfer phase to receive the K value. When the renegotiation phase starts, the wireless power receiver transmits GRQ/k corresponding to a packet requesting the K value to the wireless power transmitter, afterwards, the wireless power receiver may receive the K value from the wireless power transmitter as a response to GRQ/k.

Here, as an example of a GRQ/k packet, the GRQ header may be 0x07, and the k header packet may be 0x2A, for example.

As an example of k packets that the wireless power receiver receives in response to the above GRQ/k, the header of the k packet may be, for example, 0x2A, and if k=0.50, the data value may be, for example, 0x32.

According to (b) of FIG. 30, the wireless power receiver can receive the k value in the power transfer phase without switching to the renegotiation phase. More specifically, if the wireless power receiver can transmit a GRQ packet in the power transfer phase, the wireless power receiver transmits the previously described GRQ/k to the wireless power transmitter in the power transfer phase, the wireless power receiver can receive the k value as a response to the above GRQ/k. Here, the detailed description of GRQ/k and k packets is the same as described above.

According to (c) of FIG. 30, the wireless power receiver may receive k packets from the wireless power transmitter without separate instructions in the power transfer phase. That is, the wireless power transmitter may periodically transmit, for example, k packets to the wireless power receiver in the power transmission phase. In this case, the wireless power receiver can periodically receive the value k from the wireless power transmitter, and thus the wireless power receiver can know the value k.

The previous content mainly focused on the wireless power receiver receiving K, but this specification also provides an example of the wireless power receiver receiving a quality factor (e.g., slot-Q, or Q) through the above protocol. That is, the wireless power receiver may request a quality factor through GRQ and receive the quality factor in response, or the wireless power receiver may periodically receive information about the quality factor from the wireless power transmitter.

As explained so far, when RX receives K and Q values from TX, there is an advantage in that it can perform the FOD function on its own. That is, the wireless power receiver may be able to adjust the FOD function according to the charging amount of the wireless power receiver based on the above K and Q. For example, at high charging amounts, the stability of the device can be ensured by strengthening the FOD function and determining FO more strictly. Conversely, at low charging amounts, the FOD function can be relaxed to prioritize charging by relatively loosely determining FO.

So far, an example of how a wireless power transmitter calculates K has been described. Below, an example of how the wireless power receiver calculates K will be described.

5. Re-Calibration Initiated by RX

When calculating the K value in RX and using it as a standard for re-calibration, the following method can be used.

The wireless power receiver may transmit an SRQ/rcs packet to the TX in the negotiation phase and request the wireless power transmitter to measure the RX-led K value and perform calibration accordingly. Thereafter, the wireless power transmitter may transmit ACK to the wireless power receiver as a response to reception of the above SRQ/rcs, allowing the above request.

The wireless power receiver can request the L1 value from the wireless power transmitter by transmitting a GRQ to the TX in the negotiation phase. Thereafter, the wireless power transmitter may transmit the L1 value to the wireless power receiver as a response to the received GRQ.

Afterwards, the wireless power receiver can enter the re-calibration phase from the power transfer phase, and the specific details of this are explained through the drawings as follows.

FIG. 31 schematically shows an example of re-calibration initiated by RX.

According to FIG. 31, the wireless power receiver can transmit an RP/0 packet to the wireless power transmitter. And, the wireless power transmitter can transmit the ATN to the wireless power receiver as a response to the RX's RP/0 packet.

Afterwards, the wireless power receiver can transmit a DSR/poll packet to the wireless power transmitter, and the wireless power transmitter can transmit V1 (new packet) to the wireless power receiver as a response to the DSR/poll packet of RX.

As above, when the wireless power receiver receives information about the voltage (V1) of the wireless power transmitter in the power transfer phase from the wireless power transmitter and the wireless power receiver receives information (L1) about the inductance of the wireless power transmitter before the power transfer phase (e.g., configuration phase or negotiation phase), the wireless power receiver can calculate the K value by itself.

For example, new V1 and V2 packets may be as follows.
V1 Packet:
  Header 0x61
  DATA 0x4E 0x20 (20000 mV)
V2 Packet:
  Header 0x62
  DATA 0x27 0x10 (10000 mV)

Here, even when a change in K is detected in the wireless power receiver, the existing calibration phase can be re-performed in the same way as described above.

Thereafter, the wireless power transmitter may perform the FOD function by estimating power loss based on newly acquired calibration data (e.g., RP/x). Here, a specific example of performing the FOD function based on power loss is as described above.

As explained so far, in the case of RX-driven K value measurement and re-calibration through it, there are the following utilization points.

Basically, re-calibration may be necessary when there is a change in the state of charge. In addition, changes in the charging state can be divided into external changes such as alignment of RX and TX or FO insertion, and internal changes to RX such as changes in RX operating voltage and load amount. Here, the RX can detect not only internal changes in the RX but also external changes in the charging state by measuring the K value. In this case, FOD performance can be maintained by requesting recalibration.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

Figure 32:
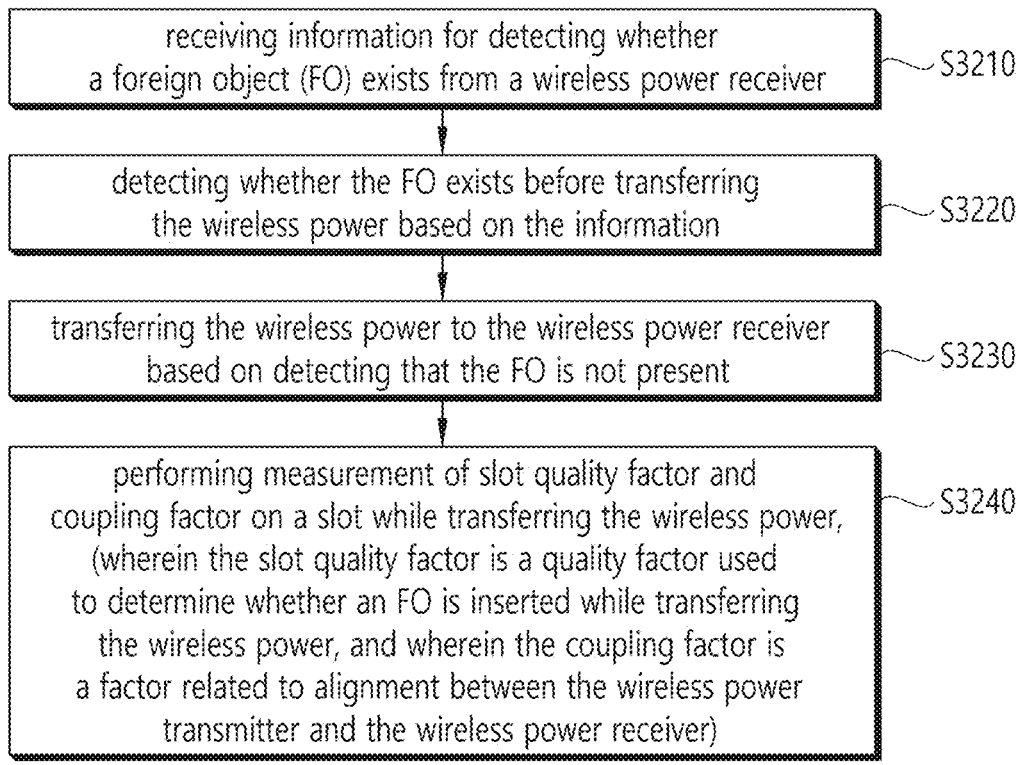
FIG. 32 is a flowchart of a method for transmitting wireless power performed by a wireless power transmitter according to an embodiment of the present specification.

FIG. 32 is a flowchart of a method for transmitting wireless power performed by a wireless power transmitter according to an embodiment of the present specification.

According to FIG. 32, the wireless power transmitter may receive information for detecting whether a foreign object (FO) exists from the wireless power receiver (S3210).

The wireless power transmitter can detect whether the FO exists before transmitting wireless power based on the information (S3220).

The wireless power transmitter may transmit the wireless power to the wireless power receiver based on detecting that the FO does not exist (S3230).

The wireless power transmitter may measure the slot quality factor and coupling factor on the slot while transmitting the wireless power (S3240). Here, the slot quality factor is a quality factor used to determine whether FO is inserted while transmitting the wireless power, and the coupling factor may be a factor related to alignment between the wireless power transmitter and the wireless power receiver.

Here, the wireless power transmitter may receive information that triggers performance of the measurement from the wireless power receiver.

In addition, the value of the slot quality factor changes depending on whether FO is inserted while transmitting the wireless power, the value of the coupling factor may vary depending on whether the FO is inserted and whether the alignment is changed while transmitting the wireless power.

At this time, based on a change in the value of the slot quality factor, the wireless power transmitter can detect that the FO has been inserted. Additionally, based on the value of the slot quality factor being maintained and the value of the coupling factor changing, the wireless power transmitter may detect that the alignment has changed.

Here, the wireless power transmitter can measure the coupling factor based on a value related to the voltage of the wireless power transmitter, a value related to the inductance of the wireless power transmitter, a value related to the voltage of the wireless power receiver, and a value related to the inductance of the wireless power receiver. At this time, the wireless power transmitter may receive a value related to the voltage of the wireless power receiver and a value related to the inductance of the wireless power receiver from the wireless power receiver. Additionally, the wireless power transmitter may receive a value related to the inductance of the wireless power receiver during the configuration phase or negotiation phase. Additionally, the wireless power transmitter may receive a value related to the power of the wireless power receiver through a control error (CE) packet or a received power (RP) packet.

Although not separately shown, according to an embodiment of the present specification, a wireless power transmitter may be provided. A wireless power transmitter may include a power converter associated with transferring wireless power to a wireless power receiver and a communicator/controller associated with communicating with the wireless power receiver and controlling the transfer of the wireless power. Here, the communicator/controller may be configured to receive information for detecting whether a foreign object (FO) exists from a wireless power receiver, be configured to detect whether the FO exists prior to delivery of wireless power based on the information, be configured to deliver the wireless power to the wireless power receiver based on detecting that the FO is not present, and be configured to perform measurement of slot quality factor and coupling factor on the slot while transmitting the wireless power. At this time, the slot quality factor is a quality factor used to determine whether FO is inserted while transmitting the wireless power, and the coupling factor may be a factor related to alignment between the wireless power transmitter and the wireless power receiver.

Figure 33:
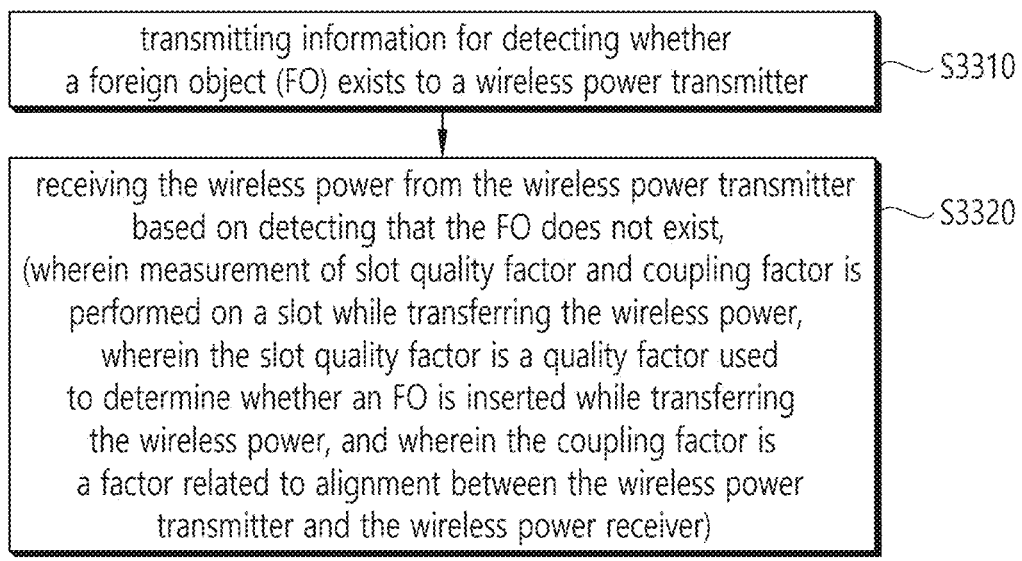
FIG. 33 is a flowchart of a method of receiving wireless power performed by a wireless power receiver, according to an embodiment of the present specification.

FIG. 33 is a flowchart of a method of receiving wireless power performed by a wireless power receiver, according to an embodiment of the present specification.

According to FIG. 33, the wireless power receiver may transmit information to detect whether a foreign object (FO) exists to the wireless power transmitter (S3310).

The wireless power receiver may receive the wireless power from the wireless power transmitter based on detecting that the FO does not exist (S3320).

At this time, measurement of the slot quality factor and coupling factor may be performed on the slot while the wireless power is transmitted. Here, the slot quality factor is a quality factor used to determine whether FO is inserted while transmitting the wireless power, and the coupling factor may be a factor related to alignment between the wireless power transmitter and the wireless power receiver.

Although not separately shown, according to an embodiment of the present specification, a wireless power receiver may be provided. A wireless power receiver may include a power pickup associated with receiving wireless power from a wireless power transmitter and a communication/controller associated with communicating with the wireless power transmitter and controlling the reception of the wireless power. Here, it may be configured to transmit information to the wireless power transmitter to detect whether a foreign object (FO) exists, and be configured to receive the wireless power from the wireless power transmitter based on detecting that the FO does not exist. At this time, while the wireless power is transmitted, the slot quality factor and coupling factor are measured on the slot, the slot quality factor is a quality factor used to determine whether FO is inserted while transmitting the wireless power, and the coupling factor may be a factor related to alignment between the wireless power transmitter and the wireless power receiver.

So far, the embodiments of this specification have been described. And, according to the above-described embodiments, the following effects may commonly occur.

To explain the effect, the problem situation explained earlier can be summarized as follows.

When providing only a foreign matter detection technique by calibration during wireless power transfer, as shown in FIG. 19, since calibration is performed only once at the start of charging, despite the possibility of a change in alignment between the wireless power transmitter and wireless power receiver during charging, the wireless power transmitter and/or wireless power receiver will not be able to detect this.

In addition, according to the material detection technique based on the quality factor before wireless power transfer, as shown in FIG. 20, since there is a difference of 1 to 2 seconds between the measurement time of the Q factor and the judgment time of FOD, there is a problem that FO may be inserted within the above time (1 to 2 seconds), which is a relatively long time from the wireless charging point of view.

As described above, according to this specification, even during wireless power transfer, the wireless power transmitter and/or wireless power receiver can calculate the quality factor in a section called a slot. And, according to this specification, not only the quality factor but also the coupling factor can be calculated during wireless power transfer.

Accordingly, the wireless power transmitter and/or wireless power receiver according to the present specification can determine as quickly as possible whether the FO is inserted and whether the alignment is disturbed even during wireless power transfer.

Through this, the wireless power transmitter and/or wireless power receiver can perform operations such as stopping wireless power transfer even when an FO is inserted during wireless power transfer, thereby increasing the stability of power transfer.

In addition, since the wireless power transmitter and/or wireless power receiver can measure the coupling factor in real time, changes in mutual alignment can be quickly estimated. That is, the wireless power transmitter and/or wireless power receiver can quickly estimate the change in alignment and determine the validity of the calibration data based on this. In other words, the wireless power transmitter and/or wireless power receiver can maintain the effectiveness of the FOD function by performing re-calibration according to alignment changes.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transferring a wireless power in a wireless power transfer system, the method performed by a wireless power transmitter and comprising:
    receiving information for detecting whether a foreign object (FO) exists from a wireless power receiver;
    detecting whether the FO exists before transferring the wireless power based on the information;
    transferring the wireless power to the wireless power receiver based on detecting that the FO is not present;
    performing measurement of quality factor and coupling factor during a slot,
    wherein, during the slot, transferring the wireless power is stopped; and
    transferring the wireless power to the wireless power receiver based on performing the measurement,
    wherein the quality factor is a factor used to determine whether an FO is inserted,
    wherein the coupling factor is a factor related to alignment between the wireless power transmitter and the wireless power receiver, and
    wherein the wireless power transmitter calculates the coupling factor based on a value for a voltage of the wireless power transmitter, a value for an inductance of the wireless power transmitter, a value for a voltage of the wireless power receiver, and a value for an inductance of the wireless power receiver.

2. The method of claim 1, wherein the wireless power transmitter receives information triggering performance of the measurement from the wireless power receiver.

3. The method of claim 1, wherein the wireless power transmitter receives the value for the voltage of the wireless power receiver and the value for the inductance of the wireless power receiver from the wireless power receiver.

4. The method of claim 3, wherein the wireless power transmitter receives the value for the inductance of the wireless power receiver during a configuration phase or a negotiation phase.

5. The method of claim 3, wherein the wireless power transmitter receives a value for power of the wireless power receiver through a control error (CE) packet or a received power (RP) packet.

6. A wireless power transmitter comprising:
    a power converter related to transferring wireless power to a wireless power receiver; and
    a communicator/controller related to controlling transfer of the wireless power,
    wherein the wireless power transmitter is configured to:
    receive information for detecting whether a foreign object (FO) exists from the wireless power receiver;
    detect whether the FO exists before transferring the wireless power based on the information;
    transfer the wireless power to the wireless power receiver based on detecting that the FO is not present;
    perform measurement of quality factor and coupling factor during a slot,
    wherein, during the slot, transferring the wireless power is stopped; and
    transfer the wireless power to the wireless power receiver based on performing the measurement,
    wherein the quality factor is a factor used to determine whether an FO is inserted,
    wherein the coupling factor is a factor related to alignment between the wireless power transmitter and the wireless power receiver, and
    wherein the wireless power transmitter calculates the coupling factor based on a value for a voltage of the wireless power transmitter, a value for an inductance of the wireless power transmitter, a value for a voltage of the wireless power receiver, and a value for an inductance of the wireless power receiver.

7. A method for receiving a wireless power in a wireless power transfer system, the method performed by a wireless power receiver and comprising:
    transmitting information for detecting whether a foreign object (FO) exists to a wireless power transmitter; and
    receiving the wireless power from the wireless power transmitter based on detecting that the FO does not exist,
    wherein measurement of quality factor and coupling factor is performed during a slot,
    wherein, during the slot, receiving the wireless power is stopped, wherein the quality factor is a factor used to determine whether an FO is inserted, and wherein the coupling factor is a factor related to alignment between the wireless power transmitter and the wireless power receiver, and wherein the coupling factor is calculated based on a value for a voltage of the wireless power transmitter, a value for an inductance of the wireless power transmitter, a value for a voltage of the wireless power receiver, and a value for an inductance of the wireless power receiver.

8. The method of claim 7, wherein the wireless power receiver transmits information triggering performance of the measurement to the wireless power transmitter.

9. The method of claim 7, wherein the wireless power receiver transmits the value for the voltage of the wireless power receiver and the value for the inductance of the wireless power receiver to the wireless power transmitter.

10. The method of claim 9, wherein the wireless power receiver transmits the value for the inductance of the wireless power receiver during a configuration phase or a negotiation phase.

11. The method of claim 9, wherein the wireless power receiver transmits a value for power of the wireless power transmitter through a control error (CE) packet or a received power (RP) packet.

* * * * *